US009374764B2

(12) United States Patent
Batz et al.

(10) Patent No.: US 9,374,764 B2
(45) Date of Patent: Jun. 21, 2016

(54) POLICY APPLICATION FOR A GROUP OF SUBSCRIBERS IN A NETWORK ENVIRONMENT

(71) Applicant: CISCO TECHNOLOGY, INC., San Jose, CA (US)

(72) Inventors: Robert M. Batz, Raleigh, NC (US); Timothy P. Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 100 days.

(21) Appl. No.: 14/052,469

(22) Filed: Oct. 11, 2013

(65) Prior Publication Data

US 2015/0103647 A1    Apr. 16, 2015

(51) Int. Cl.
 H04W 48/04    (2009.01)
 H04W 8/00    (2009.01)
 H04W 28/02    (2009.01)

(52) U.S. Cl.
 CPC .............. *H04W 48/04* (2013.01); *H04W 8/00* (2013.01); *H04W 28/0215* (2013.01)

(58) Field of Classification Search
 None
 See application file for complete search history.

(56) References Cited

U.S. PATENT DOCUMENTS

2009/0312045 A1*  12/2009  Miller ................. H04W 8/186
                                                                    455/519
2010/0260141 A1*  10/2010  Chowdhury et al. ......... 370/331
2014/0003431 A1*   1/2014  Mann et al. ................... 370/392
2014/0185490 A1*   7/2014  Holm et al. ................... 370/259
2015/0005004 A1*   1/2015  Cuervo et al. .............. 455/456.1

FOREIGN PATENT DOCUMENTS

CN    104581814 A    4/2015
EP    2613597    7/2013

(Continued)

OTHER PUBLICATIONS

"ETSI TS 123203 V9.8.0 (Mar. 2011) Technical Specification: Digital Cellular Telecommunications System (Phase 2+); Universal Mobile Telecommunications System (UMTS); LTE; Policy and charging control architecture (3GPP TS 23.203 version 9.8.0 Release 9);" European Telecommunications Standards Institute 2011, F-06921 Sophia Antipolis Cedex France; Mar. 2011, 125 pages.

(Continued)

*Primary Examiner* — Hoon J Chung
*Assistant Examiner* — Zhensheng Zhang
(74) *Attorney, Agent, or Firm* — Patent Capital Group

(57) ABSTRACT

An example method includes reporting location changes for one or more users from a first network element to a second network element based on transitions for each of the one or more users in relation to a policy location area, wherein the policy location area is defined by one or more first user location information (ULI) information elements (IEs); communicating a per-peer Rx authorization and accounting request (Rx AAR) message to initiate a policy change, wherein the per-peer Rx AAR message comprises the one or more first ULI IEs; communicating a per-Diameter-peer Gx reauthorization request (Gx RAR) message including the one or more first ULI IEs; identifying one or more users for the policy change based, at least in part, on a corresponding ULI IE for each user and the one or more first ULI IEs; and applying the policy change to each of the identified one or more users.

18 Claims, 8 Drawing Sheets

(56) References Cited

FOREIGN PATENT DOCUMENTS

| EP | 2860999 | 4/2015 |
|---|---|---|
| WO | WO2010/057200 | 5/2010 |
| WO | WO2013/053896 | 4/2013 |

OTHER PUBLICATIONS

"ETSI TS 123401 V9.8.0 (Mar. 2011) Technical Specification; LTE; General Packet Radio Service (GPRS) enhancements for Evolved Universal Terrestrial Radio Access Network (E-UTRAN) access (3GPP TS 23.401 Version 9.8.0 Release 9);" European Telecommunications Standards Institute 2011, F-06921 Sophia Antipolis Cedex France; Mar. 2011, 261 pages.
"ETSI TS 129212 V9.5.0 (Jan. 2011) Technical Specification; Universal Mobile Telecommunications Systems (UMTS); LTE; Policy and charging control over GX reference Point (3GPP TS 29.212 version 9.5.0 Release 9);" European Telecommunications Standards Institute 2011, F-06921 Sophia Antipolis Cedex France; Jan. 2011; 120 pages.
"ETSI TS 129213 V9.5.0 (Jan. 2011) Technical Specification: Digital Ccellular Telecommunications Systems (Phase 2+); Universal Mobile Telecommunications System (UMTS); LTE; Policy and charging control signalling flows and Quality of Service (QoS) parameter mapping (3GPP TS 29.213 Version 9.5.0 Release 9);" European Telecommunications Standards Institute 2011, F06921 Sophia Antipolis Cedex France; Jan. 2011; 131 pages.
"ETSI TS 129274 V.9.5.0 (Jan. 2011) Technical Specification: Universal Mobile Telecommunications Systems (UMTS); LTE; 3GPP Evolved Packet System (EPS); Evolved General Packet Radio Service (GPRS); Tunnelling protocol for Control Plane (GTPv2-C); Stage 3 (3GPP-TS 29.274 version 9.5.0 Release 9);" European Telecommunications Standards Institute 2011, F-06921 Sophia Antipolis Cedex France; Jan. 2011; 174 pages.
"Technology Supporting Core Network (EPC) Accommodating LTE," Technology Reports: Special Articles on "Xi" (Crossy) LTE Service—Toward Smart Innovation-, NTT DOCOMO Technical Journal vol. 13, No. 1, Jun. 2011; 6 pages.
"Diameter Signaling Network in EPS: Principles and Architecture," EFORT, Mar. 24, 2012; 6 pages; http://www.efort.com.
Singh, Amandeep, "Overview of the Evolved Packet Core Network," Project Report submitted to the Faculty of graduate studies and research in partial fulfillment of the requirements of the degree of Masters of Engineering (Specialization: Communications), University of Alberta, First published on or about Aug. 2, 2013; 28 pages.
"ETSI TS 129 214 V8.17.0 (Sep. 2013) Technical Specification: Universal Mobile Telecommunications System (UMTS); LTE; Policy and charging control over Rx reference point (3GPP TS 29.214 version 8.17.0 Release 8)," European Telecommunications Standards Institute, 650 Route Des Lucioles ; F-06921 Sophia-Antipolis Cedex; Sep. 2013, 45 pages.
"ETSI TS 129 214 V9.14.0 (Sep. 2013) Technical Specification: Universal Mobile Telecommunications System (UMTS); LTE; Policy and charging control over Rx reference point (3GPP TS 29.214 version 9.14.0 Release 9)," European Telecommunications Standards Institute, 650 Route Des Lucioles ; F-06921 Sophia-Antipolis Cedex; Sep. 2013; 49 pages.
"ETSI TS 129 214 V10.11.0 (Sep. 2013) Technical Specification: Universal Mobile Telecommunications System (UMTS); LTE; Policy and charging control over Rx reference point (3GPP TS 29.214 version 10.11.0 Release 10)," European Telecommunications Standards Institute, 650 Route Des Lucioles ; F-06921 Sophia-Antipolis Cedex; Sep. 2013; 54 pages.
"ETSI TS 129 214 V11.10.0 (Sep. 2013) Technical Specification: Universal Mobile Telecommunications System (UMTS); LTE; Policy and charging control over Rx reference point (3GPP TS 29.214 version 11.10.0 Release 11)," European Telecommunications Standards Institute, 650 Route Des Lucioles ; F-06921 Sophia-Antipolis Cedex; Sep. 2013; 60 pages.
"3GPP TS 29.214 V12.1.0 (Sep. 2013) Technical Specification: 3rd Generation Partnership Project; Technical Specification Group Core Network and Terminals; Policy and Charging Control over Rx reference point (Release 12)," 3GPP, 3rd Generation Partnership Project, 650. Route Des Lucioles; F-06921 Sophia-Antipolis Cedex; France; Sep. 2013, 58pgs.
EPO Feb. 25, 2015 Search Report and Written Opinion from European Application No. 14188375.1.
"ETSI TS 129 213 V10.8.0 (Jan. 2013) Technical Specification: Digital Cellular Telecommunications System (Phase 2+); Universal Mobile Telecommunications System (UMTS); LTE; Policy and charging control signaling flows and Quality of Service (QoS) parameter mapping (3GPP TS 29.213 version 10.8.0 Release 10);" European Telecommunications Standards Institute, 650 Route Des Lucioles ; F-06921 Sophia-Antipolis Cedex; Jan. 2013, 143 pages.
"3GPP TS 23.203 V12.2.0 (Sep. 2013) Technical Specification: 3rd Generation Partnership Project; Technical Specification Group Services and System Aspects; Policy and charging control architecture (Release 12)," 3rd Generation Partnership Project; 650. Route Des Lucioles; F06921 Sophia-Antipolis Cedex; France; Sep. 2013, 204 pages.
"3GPP TS 29.212 V12.2.0 (Sep. 2013) Technical Specification: 3rd Generation Partnership Project; Technical Specification Group Core Network and Terminals; Policy and Charging Control (PCC); Reference points (Release 12)," 3rd Generation Partnership Project, 650. Route Des Lucioles; F-06921 Sophia-Antipolis Cedex; France; Sep. 2013, 212 pages.
"ETSI TS 129 212 V.11.6.0 (Oct. 2012) Technical Specification: Universal Mobile Telecommunications System (UMTS); LTE; Policy and Charging Control (PCC) over Gx/Sd reference point (3GPP TS 29.212 version 11.6.0 Release 11)," European Telecommunications Standards Institute, 650 Route Des Lucioles ; F-06921 Sophia-Antipolis Cedex; Oct. 2012, 198 pages.
"ETSI TS 129 212 V10.12.0 (Sep. 2013) Technical Specification: Universal Mobile Telecommunications System (UMTS); LTE; Policy and Charging Control (PCC); Reference points (3GPP TS 29.212 version 10.12.0 Release 10)," European Telecommunications Standards Institute, 650 Route Des Lucioles ; F-06921 Sophia-Antipolis Cedex; Sep. 2013, 138 pages.
"ETSI TS 129 212 V11.10.0 (Sep. 2013) Technical Specification: Universal Mobile Telecommunications System (UMTS); LTE; Policy and Charging Control (PCC); Reference points (3GPP TS 29.212 version 11.10.0 Release 11)," European Telecommunications Standards Institute, 650 Route Des Lucioles ; F-06921 Sophia-Antipolis Cedex; Sep. 2013; 201 pages.
"ETSI TS 129 212 V7.15.0 (Jan. 2013) Technical Specification: Universal Mobile Telecommunications System (UMTS); LTE; Policy and Charging Control (PCC); Reference points (3GPP TS 29.212 version 7.15.0 Release 7)," European Telecommunications Standards Institute, 650 Route Des Lucioles ; F-06921 Sophia-Antipolis Cedex; Jan. 2013, 50 pages.
"ETSI TS 129 212 V8.20.0 (Sep. 2013) Technical Specification: Universal Mobile Telecommunications System (UMTS); LTE; Policy and Charging Control (PCC); Reference points (3GPP TS 29.212 version 8.20.0 Release 8)," European Telecommunications Standards Institute, 650 Route Des Lucioles ; F-06921 Sophia-Antipolis Cedex; Sep. 2013, 109 pages.
"ETSI TS 129 212 V9.16.0 (Jan. 2014) Technical Specification: Universal Mobile Telecommunications System (UMTS); LTE; Policy and Charging Control (PCC); Reference points (3GPP TS 29.212 version 9.16.0 Release 9)," European Telecommunications Standards Institute, 650 Route Des Lucioles ; F-06921 Sophia-Antipolis Cedex; Jan. 2014, 126 pages.
"ETSI TS 129 212 V9.5.0 (Jan. 2011) Technical Specification: Universal Mobile Telecommunications System (UMTS); LTE; Policy and Charging control over Gx reference point (3GPP TS 29.212 version 9.5.0 Release 9)," European Telecommunications Standards Institute, 650 Route Des Lucioles ; F-06921 Sophia-Antipolis Cedex; Jan. 2011, 120 pages.
"ETSI TS 129 214 V7.12.0 (Oct. 2012) Technical Specification: Universal Mobile Telecommunications System (UMTS); LTE;

(56) References Cited

OTHER PUBLICATIONS

Policy and charging control over Rx Reference point (3GPP TS 29.214 version 7.12.0 Release 7)," European Telecommunications Standards Institute, 650 Route Des Lucioles ; F-06921 Sophia-Antipolis Cedex; Oct. 2012, 41 pages.
Brown, Gabriel, "LTE/SAE & the Evolved Packet Core: Technology Platforms & Implementation Choices," White Paper, Alcatel-Lucent, Apr. 2009; 21 pages.
Calhoun, P., et al., "Diameter Base Protocol," Network Working Group RFC 3588, Sep. 2003; 147 pages.
Palat,Sudeep, et al., "The LTE Network Architecture: A comprehensive tutorial," Alcatel-Lucent Strategic White Paper; 26 pages; Originally published Feb. 2009 as a chapter in *LTE—The UMTS Long Term Evolution: From Theory to Practice*, edited by Stefania Sesia, Issam Toufik and Matthew Baker.
Suthar, Prakash, "Designing LTE with IPv6," Cisco Live 2011 @ Vegas, Jul. 20-14, 2011; 34 pages.

* cited by examiner

POLICY APPLICATION FOR A GROUP OF SUBSCRIBERS IN A NETWORK ENVIRONMENT

TECHNICAL FIELD

This disclosure relates in general to the field of communications and, more particularly, to policy application for a group of subscribers in a network environment.

BACKGROUND

Networking architectures have grown increasingly complex in communications environments, particularly mobile wireless environments. Data traffic has grown extensively in recent years, which has significantly increased the demands on network resources. As the number of mobile subscribers increases, efficient management of communication resources becomes even more critical. In some instances, the application of policy actions to a group of subscribers may cause network equipment to be overwhelmed, provide suboptimal performance or create congestion in the network. Accordingly, there are significant challenges in managing network resources, particularly for the application of policy actions for a group of subscribers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes reporting one or more location changes for one or more users from a first network element to a second network element based on transitions for each of the one or more users in relation to a policy location area, wherein the policy location area is defined by one or more first user location information (ULI) information elements (IEs); communicating a per-peer Rx authorization and accounting request (Rx AAR) message from a third network element to a fourth network element to initiate a policy change, wherein the per-peer Rx AAR message comprises an application identifier (ID) for a service definition and the one or more first ULI IEs; communicating a per-Diameter-peer Gx reauthorization request (Gx RAR) message from the fourth network element to the second network element, wherein the per-Diameter-peer Gx RAR message comprises a policy action for the policy change based on the service definition and the one or more first ULI IEs; identifying, at the second network element, one or more users for application of the policy change based, at least in part, on a corresponding ULI IE for each user and the one or more first ULI IEs; and applying the policy change to each of the identified one or more users.

In other example embodiments, the first network element can be a Mobility Management Entity (MME), a S4 Serving Gateway Support Node (S4-SGSN) or a GnGp-SGSN, the second network element can be a packet data network gateway (PGW), the third network element can be an Application Function (AF) and the fourth network element can be a Policy and Charging Rules Function (PCRF).

In some instances, the reporting can include receiving at the first network element a location update for a particular user based on a transition for the user, wherein the location update includes a current ULI IE for the particular user and an ID for the particular user; comparing a previous ULI IE and the current ULI IE for the particular user to the one or more first ULI IE to determine if the particular user has entered or exited the policy location area; and reporting a location change for the particular user to the second network element based on the user entering or exiting the policy location area. In other instances, the identifying the one or more users for application of the policy change can include comparing the ULI IE for each user to each of the one or more first ULI IEs; and identifying a user for the policy change based on the ULI IE for the user matching one of the one or more first ULI IEs.

Example Embodiments

Figure 1:
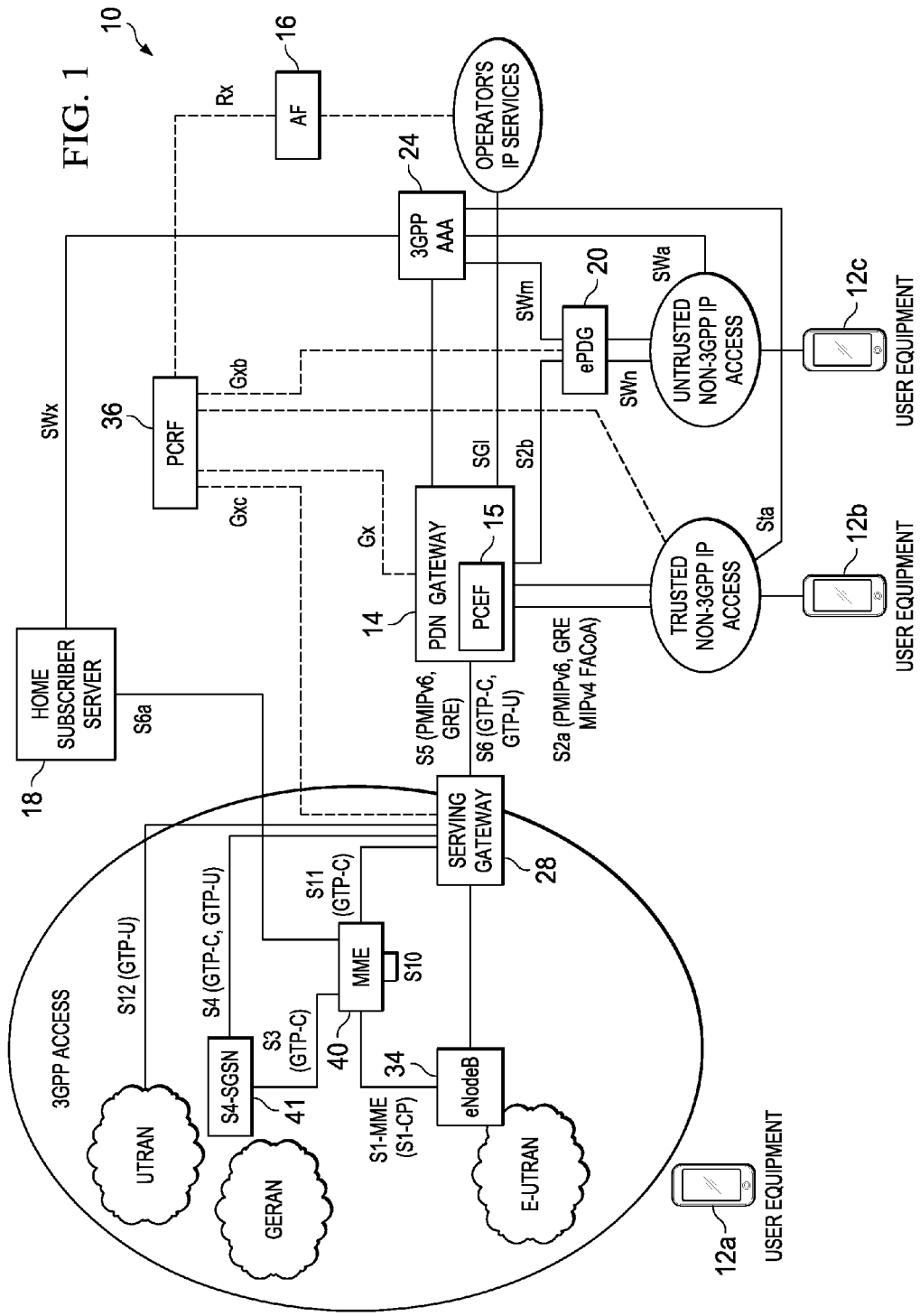
FIG. 1 is a simplified block diagram illustrating a communication system to facilitate policy application to a group of subscribers in a network environment according to one embodiment of the present disclosure.

Turning to FIG. 1, FIG. 1 is a simplified block diagram illustrating a communication system 10 to facilitate dynamic policy applications to a group of subscribers in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-c and packet data network (PDN) gateway (PGW) 14, which has a logical connection to a serving gateway (SGW) 28. Also provided are a home subscriber server (HSS) 18, an Authentication, Authorization and Accounting (AAA) element 24 and an S4 serving gateway support node (S4-SGSN) element 41. PGW 14 may include a Policy and Charging Enforcement Function (PCEF) 15. SGW 28 has a logical connection to an eNodeB 34 and a Mobility Management Entity (MME) 40. SGW 28 also has a logical connection to S4-SGSN 41. Both SGW 28 and PGW 14 can interface with a Policy and Charging Rules Function (PCRF) 36. An Application Function (AF) 16 may interface with the PCRF 36. As discussed herein, the terms 'user equipment,' 'user' and 'subscriber' are interchangeable.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in TS 23.060, TS 23.401, TS 23.203, TS 29.060, TS 29.212, TS 29.274, etc. The EPS generally consists of UE access networks and an Evolved Packet Core (EPC). Access networks may be 3GPP access networks including legacy access networks such as GSM EDGE Radio Access Network (GERAN), UMTS Terrestrial Radio Access Network (UTRAN) or LTE access networks such as Evolved UTRAN (E-UTRAN), or they may be non-3GPP IP access networks such as digital subscriber line (DSL), Cable, WiMAX, code division multiplex access (CDMA) 2000, WiFi, or the Internet.

Non-3GPP IP access networks can be divided into trusted and untrusted segments. For the trusted segment, a viable relationship exists between a service provider and the core network. Trusted IP access networks support mobility, policy and AAA interfaces to the EPC, whereas untrusted networks do not. Instead, access from untrusted access networks is done via an evolved packet data gateway (ePDG) 20, which provides for IPsec security associations to the user equipment over the untrusted IP access network. The ePDG has a logical connection to the PCRF 36 and supports mobility, policy and AAA interfaces to the EPC, similar to the trusted IP access networks.

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12*a-c*. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include a Diameter protocol, service gateway interface (SGI), terminal access controller access-control system (TACACS), TACACS+, etc. RADIUS, Diameter and various interfaces related to communication for the protocols will be discussed in further detail below, as related to various embodiments of the present disclosure.

The EPC generally comprises an MME, an S4-SGSN, an SGW, a PGW (which may include a PCEF) and a PCRF. The components may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification; SGW and PGW selection for UE and authentication services. The SGW is a data plane element that can manage user mobility and interfaces with RANs. The SGW also maintains data paths between eNodeBs and the PGW. The PGW provides connectivity for UEs to external packet data networks, such as, for example an IP connectivity access network (IP-CAN). The S4-SGSN may provide access for legacy universal mobile telecommunications systems (UMTS) network devices. For example, UE on the GERAN can communicate through the S4-SGSN 41 to the SGW 28 or the PGW 14, which can include a gateway GPRS support node (GGSN) to support communication with legacy systems that may include GnGp-SGSNs.

Radio Access Networks (RANs) in an EPS architecture consist of eNodeBs (also known as eNBs). An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE.

PCRF 36 may decide policy control and/or charging activities to apply to UE based on various Policy Charging and Control (PCC) rules. PCRF 36 can be configured to use user subscription information as a basis for the policy and charging control decisions. The subscription information may apply for both session-based and non-session based services. Additionally, PCRF 36 may determine PCC rules based on an application or service described to the PCRF from AF 16. PCRF 36 may be referred to generally as a policy server. AF 16 may describe applications/services to PCRF 36 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. PCRF 36 may communicate PCC rules to PCEF 15 in PGW 14. PGW/PCEF 14/15 may serve as the policy enforcement point to manage QoS, online/offline flow-based charging, data generation, deep-packet inspection and lawful intercept.

As shown in FIG. 1, a Diameter-based interface, Rx, may be maintained between AF 16 and PCRF 36 for communicating information between the AF 16 and PCRF 36. The PCRF 36 may provision PCC rules for the PCEF 15 (within PGW 14) using a Diameter-based Gx interface. Communication system 10 may be configured with additional Diameter interfaces to manage policy and control between various elements of the system 10. For example, Diameter interfaces, Gxa, Gxb and Gxc, may be maintained between the PCRF 36 and the trusted/non-trusted IP access points, the ePDG 20, and the SGW 28, respectively. Further Diameter interfaces, SWx, STa, SWa and SWm may be maintained between the AAA element 24 and the HSS 18, the trusted non-3GPP IP access point, the untrusted non-3GPP access point, and the ePDG 20, respectively. Various additional Diameter interfaces may include S6a between the HSS 18 and the MME 40, S6b between the AAA element 24 and the PGW 14, and SWn between the ePDG 20 and the untrusted non-3GPP access point.

In operation, for example, UE 12*a* can attach to the network for purposes of establishing a communication session. UE 12*a* can communicate with eNodeB 34, which can further interact with MME 40 to complete some form of authentication for a particular user. MME 40 can interact with SGW 28, which interacts with PGW 14 such that a session can be setup between these components. The eNodeB 34 can interact with SGW 28 to provide data plane interactions for UE 12*a*. Tunnels can be established at this juncture, and a suitable IP address can also be issued for this particular user. This process generally involves a default EPS bearer session being created for UE 12*a*. Dedicated bearer sessions can also be created for various services. Exemplary tunnel protocols such as GPRS tunneling protocol (GTP), which can be separated into control (GTP-C) signaling protocols and user data plane (GTP-U) protocols, are shown in FIG. 1 between various elements of communication system 10. As the session is established, PGW 14 can interact with PCRF 36 to identify policies associated with this particular user, such as a certain QoS setting, bandwidth parameter, latency setting, priority, billing, etc. As the AF 16 updates services/applications described to the PCRF 36 during the session, dynamic policies may be applied to UE to effect various control and policy changes for UE.

Before detailing further operations and infrastructure of various elements of FIG. 1, certain contextual information is provided to offer an overview of some problems that may be encountered while applying dynamic policies for a group of subscribers (UE) in a network environment. Such information is offered earnestly and for teaching purposes only and, therefore, should not be construed in a way to limit the broad applications for the present disclosure.

A fast growing area of technical interest and potential revenue for service providers and equipment manufacturers is the ability to apply dynamic policy changes based on intelligence made available by the underlying network architecture. Such intelligence may include monitoring system load, monitoring system usage based on time and/or service type, learning system optimization techniques to optimize or actively manage QoS, etc. Dynamic policy interactions are commonly defined as per-subscriber actions and are generated on a per-subscriber basis. However, there are a number of potential use cases where a mobile wireless service provider may have service requirements such that a dynamic policy change should be applied to a group of subscribers.

Such groups may be defined as users within a given location, belonging to a particular address range, an International mobile Subscriber Identity (IMSI) range, an International Mobile Station Equipment Identity (IMEI) set, an International Mobile Station Equipment Identity Software Version (IMEISV) set, etc. However, generating an "apply-dynamic-policy" event on a per-subscriber basis is an inefficient use of node and network resources and does not scale effectively for large groups (e.g., in the thousands or tens of thousands). The problem described requires a mechanism to identify a group of subscribers that should be subject to a policy action and to efficiently signal group policy updates in a manner that does not overload network elements.

In accordance with one embodiment, communication system 10 can overcome the aforementioned shortcomings (and others) by providing a method for identifying a group of subscribers by location for which a dynamic policy action should apply and applying one or more dynamic policy actions to the identified subscribers for a policy change. The communication system 10 may provide for communicating group-based Rx AAR messages on a per-peer basis between AF 16 and PCRF 36 in order to communicate a dynamic policy action for a group of subscribers. Communicating group-based Rx AAR messages on a per-peer basis may greatly reduce the signaling load between these network elements over signaling such Rx AAR messages on a per-subscriber session basis. It should be understood that the example embodiments and process flows described in the present disclosure are not limited to the application of dynamic policy actions alone but may be equally extended to the application of policy actions that may not be dynamic. The dynamic policy actions described in the example embodiments and process flows are provided for illustrative purposes only and are not meant to limit the scope of the present disclosure.

An area that may be used to determine a group of subscribers that are to receive the dynamic policy action may be referred to herein as a "dynamic-policy-location area" (DPLA). In effect, a DPLA may create a geo-fenced area, which may provide for applying one or more dynamic policy action to users within the geo-fenced area. As users enter or exit a given DPLA, MME 40 and/or S4-SGSN 41 (or GnGp-SGSNs via legacy systems) may report location changes to PGW 14 through SGW 28 via location change messaging. PGW 14 may maintain a list of user locations based on the MME and/or S4-SGSN location change messaging. To apply a policy change to subscribers in the DPLA, AF 16 may generate a per-peer service action message and communicate the message to a corresponding PCRF peer (or multiple PCRF peers, depending on use case) that manages dynamic policy actions for the group of subscribers. PCRF 36 may generate a policy action message and may communicate the message to a corresponding PGW peer (or multiple PGW peers, depending on use case). PGW 14 may identify one or more subscribers in the DPLA by comparing updated user locations to one or more locations identified for the DPLA.

As previously noted, PGW 14 may include PCEF 15. PGW/PCEF 14/15 may apply the dynamic policy action to the identified group of subscribers. The terms PGW and PGW/PCEF as used throughout the present disclosure are interchangeable. The dynamic policy action may be applied to the group of subscribers identified in the DPLA on a per-subscriber basis using one or more bearer procedures such as modification, activation or deactivation as defined in TS 23.401. Additional details regarding various processes associated with the application of dynamic policy actions are discussed through various example operations and process flows provided below. Per-peer messaging may also be referred to herein as peer-based messaging in certain examples.

In various embodiments, a DPLA could be as granular as a cell, a set of cells (contiguous or non-contiguous), a tracking area or set of tracking areas, a routing area or set of routing areas or any other desired set of areas to a granularity as may be described by the parameters of a standard user location information (ULI) information element (IE) as defined in TS 29.274. A ULI IE may be referred to herein interchangeably as a ULI. A location area for a DPLA may be represented by one or more ULI IEs. Multiple DPLAs may be defined and, in some cases, may overlap each other based on their corresponding location areas. A DPLA may be a logical construct that has only local significance. MME 40 and/or S4-SGSN 41 may be made DPLA aware for location change reporting purposes by configuring a DPLA database for each of MME 40 and/or S4-SGSN 41. For MME 40 and/or S4-SGSN 41, one or more DPLA(s) could, for example, be locally configured by a network operator or service provider, learned as part of interaction with an external intermediary such as a managed IP network element (MINE) or based on information received or retrieved from another network element, such as, for example HSS 18 over S6a. Alternatively, a DPLA-construct could be defined in standards and passed as a message parameter between nodes of communication system 10.

In operation, MME 40 and/or S4-SGSN 41 may receive location updates from UE as users operating the UE transition between areas serviced by MME 40 and/or S4-SGSN 41. UE location updates may include, among other things, ULI-based location information, such as, for example, ULI IEs representing a TAI, RAI, cell identifier, etc. and a user/subscriber identity (ID) (e.g., IMSI) for a user associated with a given UE. Based on the UE location updates, location change messaging can be reported from MME 40 and/or S4-SGSN 41 to PGW/PCEF 14/15 in a real-time or approximately real-time manner when a user transitions or moves into and out of one or more DPLA(s), as may be defined by one or more corresponding ULI IEs. MME 40 and/or S4-SGSN 41 may report to PGW/PCEF 14/15 an ID and corresponding ULI IE for a particular user that enters or exits a particular DPLA. In an embodiment, location change information for multiple users can be included in a single location change message. In some cases, UE location updates may be received by MME 40 through a tracking area update (TAU) for 4G capable UEs and/or S4-SGSN 41 (or a GnGp-SGSN) through routing area update (RAU) messages for 2G/3G capable UEs. RAUs and TAUs may be initiated through network paging functions (for UE ECM-IDLE state), through UE RAU/TAU timers, when a UE is transitioned to a tracking/routing area that is not included in its current tracking/routing area list, changes of Radio Access Technology (RAT), Time zone or Public Land Mobile Network (PLMN) or through other triggers/mechanisms as described in TS 23.401.

In other cases, MME 40 and/or S4-SGSN 41 may request optional location updates from UE for location updates when the UE is in ECM-CONNECTED state. For example, for MME 40 such UE location updates may include a tracking area identity (TAI) and a cell identifier for the UE. The cell identifier may be represented as a cell global identifier (CGI) or E-UTRAN CGI (ECGI) depending on use case. Based on the granularity of location updates requested by MME 40, UE location updates may be communicated as a user transitions from one cell to another within a coverage area.

As the above techniques illustrate, there are many different processes that may be employed to receive location updates from UE. From UE location updates, MME 40 and/or S4-SGSN 41 may determine current and previous ULI IEs for user transitions. Because both DPLA granularity and the UE location updates are based on ULI IEs, the context of UE transitions in relation to one or more DPLA(s) may be easily determined using a DPLA module in MME 40 and/or S4-SGSN 41.

Consider an example involving a given DPLA configured for MME 40 in a DPLA database in which the DPLA is defined by a pair of tracking area ULI IEs. Upon receiving a location update for a given UE, a DPLA module within MME 40 may compare previous and current ULI IEs for the UE to the ULI IEs representing one or more DPLA(s) to determine if a user has entered and/or exited one or more DPLA(s). If the DPLA module determines that the user has entered or exited the DPLA, MME 40 may report a location change PGW/PCEF 14/15 including the user ID and a corresponding ULI IE for the new location. PGW 14 may update ULI information stored for the user. Based on standards, PGW 14 may store the user ID and associated ULI IE for the user. If the DPLA module determines that the user has neither entered nor exited one or more DPLA(s), MME 40 may not report a location change for the user to PGW/PCEF 14/15.

According to 3GPP standards, optional location change messaging between the MME 40 and PGW/PCEF 14/15 can be performed for every location update received by MME 40. However, this level of location change message granularity is unnecessary for communication system 10 according to the various embodiments described herein. According to one example embodiment, PGW 14 may request DPLA-level reporting actions from MME 40 and/or S4-SGSN 41 using a Change Reporting Action IE such that MME 40 and/or S4-SGSN 41 may only report location changes for subscribers based on subscribers entering or exiting one or more DPLA(s).

In operation, AF 16, responsible for initiating a dynamic policy event for a given location, would identify a given DPLA by communicating a per-peer message to PCRF 36 including a list of one or more ULI IEs that comprise the DPLA. It should be noted that the message may include other ULI IEs for other location areas to be affected by the policy change. The list of ULI IEs, together with a unique AF-application identifier (ID) for a service definition representing a user service, can be passed from AF 16 to each of PCRF, here PCRF 36, as part of a group-based per-peer (e.g., per-PCRF) Rx authorization and accounting request (AAR) message to trigger a policy change request. This group-based per-peer Rx AAR message would replace the multiple per-subscriber Rx AAR messages that are typically sent for each subscriber affected by a dynamic policy change. For a given network deployment, it is likely that the number of per-subscriber messages that would typically be sent to effect a group policy change would significantly exceed the number of per-PCRF group-based messages that may be sent from AF 16 to PCRF 36 according to the various example embodiments described herein.

From the AF-application ID for the service, PCRF 36 may determine an applicable dynamic policy action to apply and may communicate a corresponding policy action message to PGW/PCEF 14/15. PCRF 36 may generate a Gx reauthorization request (RAR) message for each of a PGW for which a previously established "per-PCEF" diameter session exists, here PGW 14. The per-Diameter-peer Gx RAR message can contain the dynamic policy action as well as the list of ULI IEs that define the DPLA (among other ULI IEs). Generally, message parameters for Diameter messages are carried in Attribute Value Pairs (AVPs), which, for purposes of the present disclosure can include parameters/data representing ULI IEs and/or other information for the various messages described herein.

As PGW 14 has been receiving location change notifications as users/UE enter or leave one or more DPLA(s), PGW 14 can identify all affected subscribers in a given DPLA by comparing the list of ULI IEs in the Gx RAR message to its stored ULI IE for each subscriber. Those subscribers having a ULI IE that matches one of the ULI IEs from the list can be identified for the policy change. It should be noted that PGW 14 may have no knowledge of the DPLA, but rather indirectly identifies users in the DPLA through the comparison of ULI IEs for each user with the ULI IEs received from the Gx RAR message.

For the identified subscribers, PGW/PCEF 14/15 can apply the dynamic policy action to each identified subscriber using standard per-subscriber bearer procedures. In one example embodiment, the application of the dynamic policy action may include S6a/S11 signaling to MME 40 to perform one or more standard per-subscriber bearer operations such as, for example, modifying, activating or deactivating a default and/or dedicated bearer for each subscriber session. In one example embodiment, failure to apply an action for a given subscriber can be reported by PGW/PCEF 14/15 to PCRF 36 and/or AF 16, if AF 16 had requested such, as a per-subscriber event via a per-subscriber Diameter session using standard Gx events.

It is noted that, although current 3GPP standards may not natively support a per-Diameter-peer Gx session, certain second generation content gateways exist, which provide for a per-Diameter-peer Gx session. Thus, mechanisms/techniques may exist within the scope of 3GPP standards to support a per-Diameter-peer Gx session to achieve the per-Diameter-peer Gx messaging. In an embodiment including multiple PCRFs and multiple PGWs, PCRF 36 could also send messages to other PCRFs regarding the dynamic policy action(s), which, in turn could communicate per-Diameter-peer Gx RAR messages to their PGWs for which a previously established Diameter session may exist.

In some embodiments, DPLA intelligence may be pushed to UEs 12a-c such that UEs 12a-c may be made DPLA aware. In one embodiment, a UE may be made DPLA aware by broadcasting DPLA ULI IEs to the UE. The UE could track then its movement in relation to one or more DPLAs based on its own TA list, RA list, etc. and could be configured to provide DPLA location updates upon entering or exiting the one or more DPLAs. Making UEs DPLA aware could provide additional network efficiencies and further enhance user experiences.

Applying a policy action for a policy change to a group of subscribers as described in the present disclosure can be extended to other use cases. In one example use case, a group of users could be identified by their location in combination with some other grouping characteristic, such as, for example, a group tag applied to a group of users by an MME and/or S4-SGSN. In an embodiment, the group tag could identify one or more users within a range of IMSIs, IMEIs and/or IMEISVs. In another embodiment, users may be grouped into classes within a location area and identified based on a class identifier (e.g., gold, silver, bronze). A given Gx RAR message could include a different dynamic policy (e.g., different QoS) for different classes of users. In another embodiment, the group tag could be applied to one or more subscribers by a PCRF based on information available to the PCRF.

In another example use case, a "group of interest" (e.g., a group of subscribers) could be determined based on analysis and/or a combination of parameters available to an MME and/or S4-SGSN. These parameters may include but not be limited to, a QoS setting, a rate of change for users/UE entering or exiting a policy location area, a carrier grouping, a user changing network types, combinations thereof or the like. In another example use case, applications of the present disclosure could be extended to use in an access network discovery and selection function (ANDSF) deployment to allow a dynamic PCC agent to detect network congestion and to signal to, for example, an ANDSF server to offload one or more users to a local WiFi or WIMAX network. In an embodiment, one or more users may be offloaded based on one or more class identifiers for users; for example, in a stadium deployment to offload different classes of users, such as gold, silver and/or bronze classes to a WiFi deployment in the stadium (e.g., offload silver and bronze users to a stadium WiFi).

UE 12a-c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone, i-Pad, a Google Droid phone, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment. UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

HSS 18 offers a subscriber database in 3GPP (e.g., GSM, LTE, etc.) environments. In one sense, HSS 18 can provide functions similar to those offered by an AAA element in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

In an embodiment, the operational functionality and services provided by SGW 28 and PGW 14 can be combined into a system architecture evolution gateway (SAE GW) (not shown), which can support combined SGW and PGW interfaces, signaling operations, functionality, services, etc. It is understood that the embodiments, process flows and use cases discussed in the present disclosure may be equally applied to communication networks that include an SAE GW.

Figure 2:
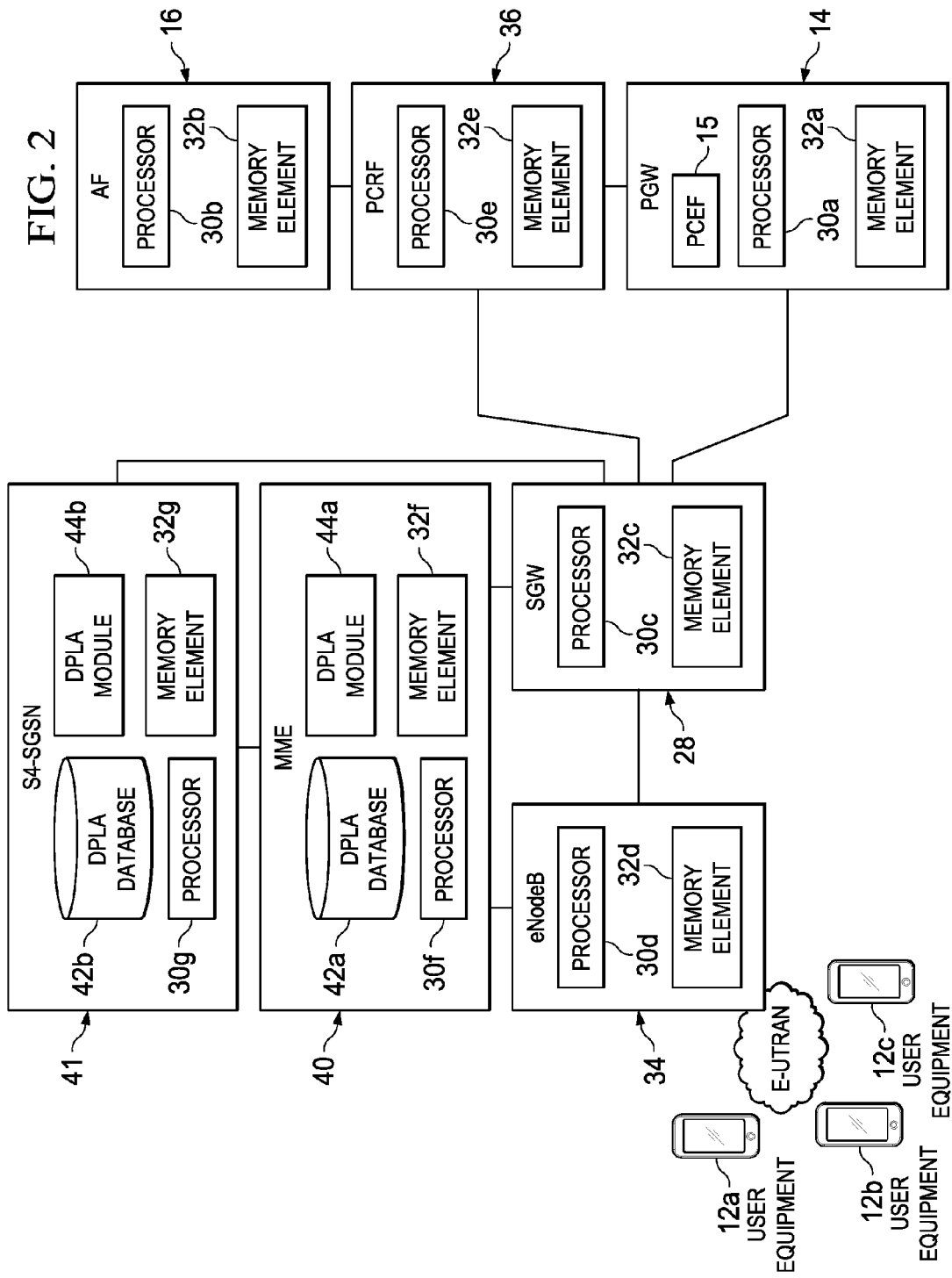
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW/PCEF 14/15, AF 16, SGW 28, eNodeB 34, PCRF 36, MME 40 and S4-SGSN 41 of communication system 10. Each of PGW 14, AF 16, SGW 28, eNodeB 34, PCRF 36, MME 40 and S4-SGSN 41 includes a corresponding processor 30a-f and a corresponding memory element 32a-f. DPLA databases 42a-b and DPLA modules 44a-b are included in MME 40 and S4-SGSN 41, respectively. For each of one or more DPLA(s), each of DPLA database 42a-b can be configured with a list of one or more ULI IEs for each of a corresponding DPLA. Each of DPLA module 44a-b can be configured to compare location updates from one or more UEs to the ULI IEs stored for each of the one or more DPLA(s) in order to identify users/UE entering or exiting the one or more DPLA(s). MME 40 and/or S4-SGSN can report location change messages for identified users to PGW 14. Hence, appropriate software and/or hardware is being provisioned in MME 40 and S4-SGSN 41 in order to facilitate the location change messaging as discussed herein. Note that in certain examples, DPLA databases 42a-b can be consolidated with memory elements (or vice versa), or the storage can overlap/exist in any other suitable manner. UE 12a-c are illustrated in FIG. 2 as connected to the E-UTRAN network to conduct their respective communication sessions.

In one example implementation, PGW 14, AF 16, SGW 28, eNodeB 34, MME 40 and/or S4-SGSN 41 are network elements, which are meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 28, eNodeB 34, MME 40 and/or S4-SGSN 41 can include memory elements (as shown in FIG. 2) for storing information to be used in achieving the DPLA location change reporting and/or for performing dynamic policy application operations for a group of subscribers in a DPLA, as outlined herein. Additionally, each of these devices may include a processor that can execute software or an algorithm to perform the activities associated with DPLA location change reporting and/or for performing dynamic policy application operations for a group of subscribers in a DPLA as discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked, sent or reported by PGW 14, AF 16, SGW 28, eNodeB 34, PCRF 36, MME 40 and/or S4-SGSN 41 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, PGW/PCEF 14/15, AF 16, SGW 28, eNodeB 34, PCRF 36, MME 40 and/or S4-SGSN 41 include software (e.g., as part of DPLA databases 42a-b or DPLA modules 44a-b, etc.) to achieve, or to foster, the DPLA location change reporting and/or the operations for performing dynamic policy applications for a group of subscribers, as outlined herein. In other embodiments, this feature may be provided externally to these elements, or included in some other network device to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the functions for performing DPLA location change reporting and/or dynamic policy applications for a group of subscribers as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
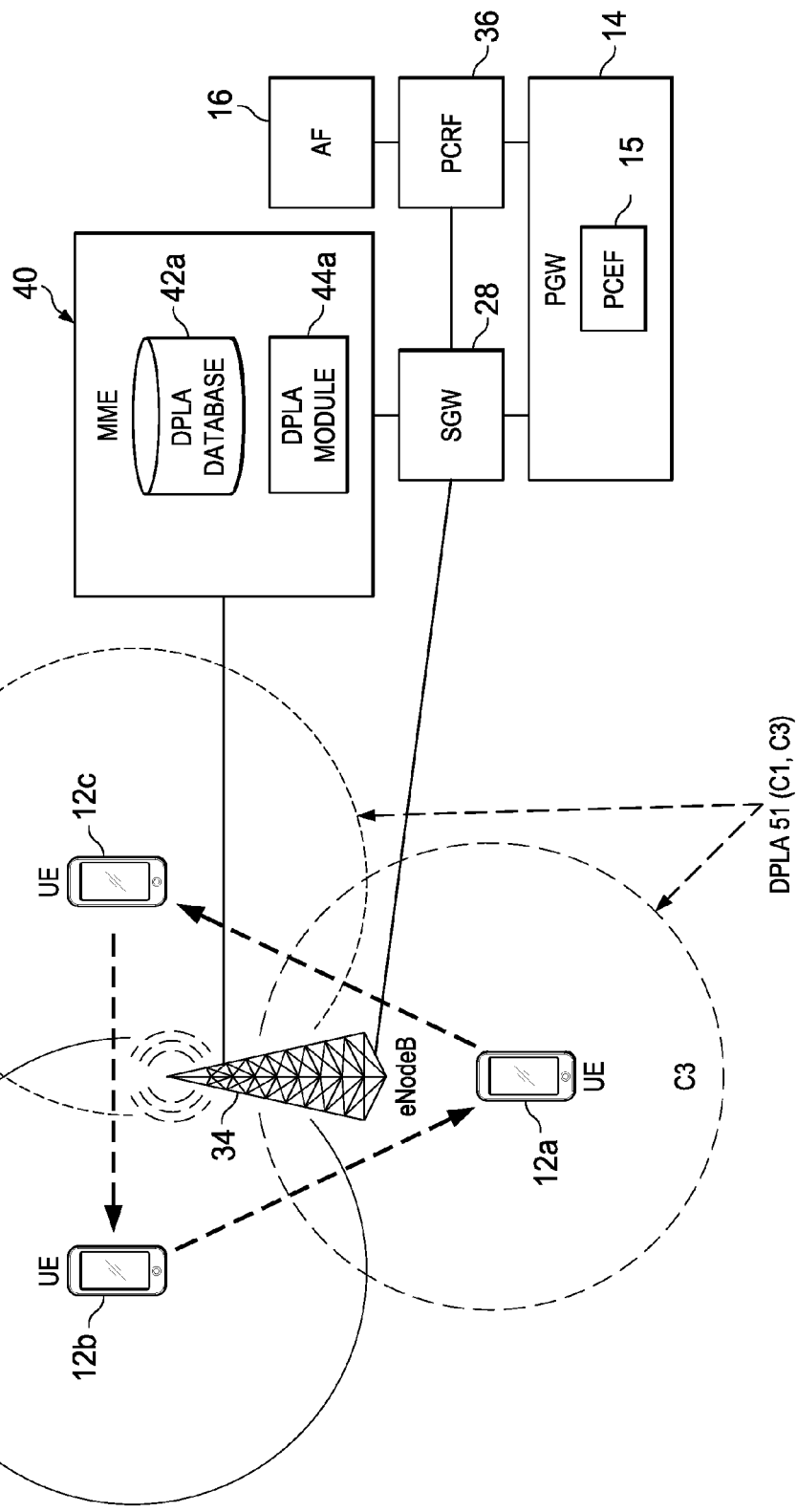
FIGS. 3-5 are simplified block diagrams illustrating details associated with example use cases in particular implementations of the communication system.

Turning to FIG. 3, FIG. 3 is simplified block diagram illustrating details associated with an example use case 50 for applying a policy change to a group of users in a particular DPLA 51, wherein DPLA 51 is defined with cell-level granularity. Also illustrated in FIG. 3 are AF 16, PCRF 36, PGW/PCEF 14/15, SGW 28, MME 40 and eNodeB 34 of communication system 10. FIG. 3 also illustrates DPLA database 42a and DPLA module 44a included in MME 40.

For this particular example, a first cell having cell ID C1, a second cell having cell ID C2 and third cell having cell ID C3 are served by eNodeB 34. DPLA 51 is illustrated in this example as being defined by cell IDs C1 and C3. Users operating UE 12a-c are shown as transitioning among the cell IDs C1-C3. DPLA 51 as shown in FIG. 3 is provided for illustrative purposes only, and is not meant to limit the scope of the present disclosure. As previously noted, a DPLA may include a cell, a tracking area, a set of tracking areas, a routing area or set of routing areas or any other location information that may be described by the parameters of a ULI IE.

A pair of ULI IEs corresponding to the first and third cell IDs C1, C3 representing DPLA 51 may be stored in the DPLA database 42a. It is understood that information for other DPLAs may be stored in the DPLA database 42a. DPLA database 42a in MME 40 may be locally configured with the ULI IEs for DPLA 51; may receive the ULI IEs for DPLA 51 from another network element; or may receive a DPLA identification message from a node within the EPC, which may be communicated to MME 40 using a 3GPP messaging schema. MME 40 may receive location updates from UE 12a-c. From the location updates, DPLA module 44a may determine if a particular user/UE has entered or exited DPLA 51 by comparing previous and/or current ULI IEs for the user to the ULI IEs representing DPLA 51. MME 40 may report location changes to PGW 14 for any users/UE entering or exiting DPLA 51. In some embodiments, MME 40 may communicate multiple location change reports for multiple users/UE to PGW/PCEF 14/15 in a single location change message.

As depicted by the dashed arrows in FIG. 3, UE 12a-c are transitioning in relation to cell IDs C1-C3. For example, UE 12a is transitioning from previous cell ID C2 to current cell ID C3, UE 12b is transitioning from previous cell ID C1 to current cell ID C2, and UE 12c is transitioning from previous cell ID C3 to current cell ID C1. MME 40 may receive a location update from UE 12*a* (via eNodeB 34) indicating its transition to current cell ID C3. Based on a comparison between the previous cell ID C2 for UE 12*a*, the current cell ID C3 for UE 12*a* and the ULI IEs corresponding to cell IDs C1 and C3 for DPLA 51, DPLA module 44*a* in MME 40 may determine that UE 12*a* has entered DPLA 51. MME 40 may report the location change for UE 12*a* to PGW/PCEF 14/15 including the user ID associated with UE 12*a* and the ULI IE corresponding to cell ID C1.

For UE 12*b*, MME 40 may receive a location update from UE 12*b* (via eNodeB 34) indicating its transition to current cell C2. Based on a comparison between the previous cell ID C1 for UE 12*b*, the current cell ID C2 for UE 12*b* and the ULI IEs corresponding to cell IDs C1 and C3 for DPLA 51, DPLA module 44*a* in MME 40 may determine that UE 12*b* has exited DPLA 51. MME 40 may report the location change for UE 12*b* to PGW/PCEF 14/15 including the user ID associated with UE 12*b* and the ULI IE corresponding to cell ID C2.

For UE 12*c*, MME 40 may receive a location update from UE 12*c* (via eNodeB 34) indicating its transition to current cell ID C1. Based on a comparison between the previous cell ID C3 for UE 12*c*, the current cell ID C1 for UE 12*c* and the ULI IEs corresponding to cell IDs C1 and C3 for DPLA 51, DPLA module 44*a* in MME 40 may determine that UE 12*c* has merely moved positions within DPLA 51. Thus, MME 40 may not report the location change for UE 12*c* to PGW/PCEF 14/15.

At any time during operation of communication system 10, AF 16 may initiate a dynamic policy event for one or more locations for which a policy change should apply. For purposes of the present example, it is assumed that AF 16 initiates a dynamic policy event when UE 12*a* and 12*c* are inside DPLA 51 and UE 12*b* is outside DPLA 51. From the perspectives of the AF and PCRF, however, these devices most likely will not have knowledge of which UE may or may not be in a DPLA when a dynamic policy event is initiated. Returning to the example in FIG. 3, AF 16 may initiate a dynamic policy event by generating a group-based per-peer Rx AAR message and communicating the Rx AAR message to peer PCRF 36. The peer-based Rx AAR message may include (among other things) a list of ULI IEs for one or more areas to be affected by the dynamic policy and an AF-application ID for a service definition representing a user service for the policy change. In the present example, the list of ULI IEs can include a pair of ULI IEs representing cell IDs C1 and C3, which are members of DPLA 51. As noted previously, other ULI IEs may also be included in the message.

Upon receiving the Rx AAR message, PCRF 36 may determine one or more dynamic policy action(s) to apply from the AF-application ID. In various embodiments, the dynamic policy action(s) may include, but not be limited to, controlling the detection for service data flows, setting charging instructions for service data flows, setting QoS levels for service data flows and/or gating. PCRF 36 may generate a per-Diameter-peer Gx RAR message and may communicate the message to peer PGW/PCEF 14/15. The Gx RAR message may include (among other things) the list of ULI IEs for the one or more areas to be affected by the policy change, which can include the ULI IEs that are members of DPLA 52, and a dynamic policy action to apply to users in the one or more areas. PGW/PCEF 14/15 may compare the ULI IEs from the Gx RAR message to the ULI IEs received from MME 40 for the user location changes in order to identify one or more users/UE for application of the policy change. From the comparison, PGW/PCEF 14/15 can determine that UE 12*a* and 12*c* are in the corresponding areas (e.g., their ULI IEs match one of ULI IEs from the list that are members of DPLA 51) and may apply the policy change to the users associated with UE 12*a* and 12*b* by signaling to MME 40 to perform one or more per-user bearer operations such as, for example, modifying, activating or deactivating a default and/or dedicated bearer for each corresponding user session. If MME 40 is unable to perform the requested bearer operations, this may be reported by PGW/PCEF 14/15 to PCRF 36 via per-subscriber Diameter messages using standard Gx events.

Thus, communication system 10 may provide for the efficient application of policy changes to the group of subscribers (e.g., users 12*a*, 12*c*) in DPLA 51. The group-based per-peer messaging between AF 16 and PCRF 36 may greatly reduce the signaling load between these network nodes over the individual per-subscriber session signaling that is typically used for the application of group-based dynamic policy changes or of group-based policy changes in general. A given policy change may be applied for each session identified by the policy enforcement or mobility anchor point (e.g. PGW/PCEF) as satisfying the group criteria. Additionally, communication system 10 may use location change messaging between MME 40 and PGW 14 based on users entering and/or exiting one or more DPLA(s) to reduce the volume of location change messaging between the MME 40 and the PGW 14, thus providing additional network efficiencies. Further, the techniques described for communication system 10 may be extended and generalized to include other group-based identification and application processes. As will be discussed in further detail below, the signaling and identification techniques described for communication system 10 may also scale to deployments that incorporate diameter routing agents.

Figure 4:
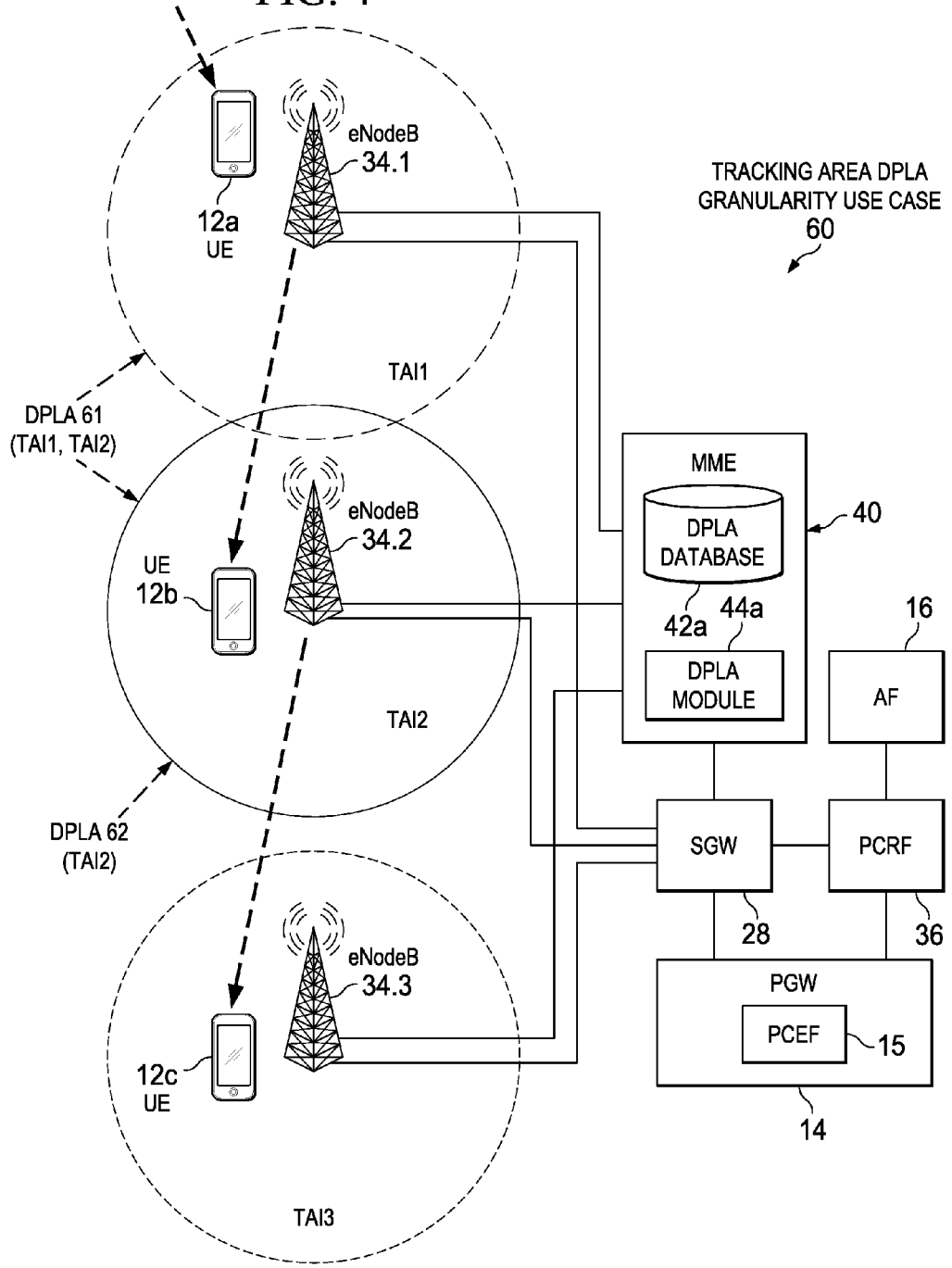

Turning to FIG. 4, FIG. 4 is simplified block diagram illustrating details associated with an example use case 60 for applying a policy change to a group of users for a first DPLA 61 and a second DPLA 62, wherein the DPLAs are defined with tracking area granularity. Also illustrated in FIG. 4 are the AF 16, PCRF 36, PGW/PCEF 14/15, SGW 28 and MME 40 of communication system 10. FIG. 4 also illustrates DPLA database 42*a* and DPLA module 44*a* included in MME 40.

For this particular example, a first tracking area having a tracking area ID TAI1 is served by a first eNodeB 34.1. A second tracking area having a tracking area ID TAI2 is served by a second eNodeB 34.2. A third tracking area having a tracking area ID TAI3 is served by a third eNodeB 34.3. Users operating UE 12*a-c* are shown as transitioning among the tracking areas TAI1-TAI3. For this example, the first DPLA 61 is illustrated as being defined by the first and second tracking area IDs, TAI1 and TAI2. The second DPLA 62 is illustrated as being defined by the second tracking area ID, TAI2. FIG. 4 illustrates that first DPLA 61 and second DPLA 62 may have overlapping location areas.

A pair of ULI IEs corresponding to the first and second tracking area IDs TAI1, TAI2, which may represent first DPLA 61, may be stored in DPLA database 42*a*. A ULI IE that identifies the second tracking area ID TAI2, which may represent second DPLA 62, may also be stored in DPLA database 42*a*. MME 40 may receive location updates from UE 12*a-c*. From the location updates, DPLA module 44*a* may determine if a particular user/UE has entered or exited the first and/or second DPLA 61 and/or 62 by comparing previous and/or current ULI IEs for the UE to the ULI IEs corresponding to DPLAs 61 and 62. MME 40 may report location changes to PGW 14 for any users/UE entering or exiting DPLAs 61 and/or 62.

As depicted by the dashed arrows in FIG. 4, UE 12*a-c* are transitioning in relation to the tracking areas TAI1-TAI3. For example, UE 12*a* is transitioning to current tracking area ID TAI1 from an area outside TAI1, UE 12*b* is transitioning from previous tracking area ID TAI1 to current tracking area ID TAI2, and UE 12*c* is transitioning from previous tracking area ID TAI3 to current tracking area ID TAI2. For the present example, location updates may be received from UE 12*a*-*c* through TAUs received from the users. For purposes of the present example, it is assumed, before each user/UE transitions, that none of tracking area IDs TAI1-TAI3 are included in the tracking area list for UE 12*a*, that tracking area IDs TAI1-TAI3 are included in the tracking area list for UE 12*b*, and that tracking area IDs TAI2 and TAI3 are included in the tracking area list for UE 12*c*.

As UE 12*a* transitions into TAI1, UE 12*a* may send a location update to MME 40. Based on a comparison between the previous tracking area ID for UE 12*a* (assume here a tracking area ID TAIx), the current tracking area ID TAI1 for UE 12*a* and the ULI IEs corresponding to tracking area IDs TAI1 and TAI2 for first DPLA 61, DPLA module 44*a* in MME 40 may determine that UE 12*a* has entered the first DPLA 61. MME 40 may report the location change for UE 12*a* to PGW/PCEF 14/15. Further, based on a comparison between the previous tracking area ID TAIx for UE 12*a*, the current tracking area ID TAI1 for UE 12*a* and the ULI IE corresponding to tracking area ID TAI2 for second DPLA 62, DPLA module 44 in MME 40 may determine that UE 12*a* has neither entered nor exited the second DPLA 62. Thus, MME 40 may not report the location change for UE 12*a* to PGW/PCEF 14/15 with regard to the location change.

As noted above, it is assumed for the present example that tracking area IDs TAI1-TAI3 are included in the tracking area list for UE 12*b*. Thus, UE 12*b* may not initiate a TAU Request based merely upon transitioning from TAI1 to TAI2, but rather may initiate a TAU Request based on a paging request, a timer function, or other network trigger/mechanism depending on the idle or connected mode of UE 12*b*. In turn, eNodeB 34.2 may forward to MME 40 the TAU Request message along with the TAI for the tracking area from which the TAU Request message was received, here, tracking area ID TAI2. The TAU message may include the tracking area ID for the last tracking area associated with UE 12*b*, here tracking area ID TAI1.

Based on a comparison between the previous tracking area ID TAI1 for UE 12*b*, the current tracking area ID TAI2 for UE 12*b* and the ULI IEs corresponding to the tracking area IDs TAI1 and TAI2 for first DPLA 61, DPLA module 44*a* in MME 40 may determine that UE 12*b* has neither entered nor exited the first DPLA 61, but merely transitioned locations within the first DPLA 61. MME 40 may not report the location change for UE 12*b* to PGW/PCEF 14/15 with regard to the first DPLA 61. Further, based on a comparison between the previous tracking area ID TAI1 for UE 12*b*, the current tracking area ID TAI2 for UE 12*b* and the ULI IE corresponding to tracking area ID TAI2 for second DPLA 62, DPLA module 44*a* in MME 40 may determine that UE 12*b* has entered the second DPLA 62. Thus, MME 40 may report the location change for UE 12*b* to PGW/PCEF 14/15 with regard to the location change, which can include the user ID associated with UE 12*b* and the ULI IE corresponding to tracking area ID TAI1.

As noted above, it is assumed for the present example that tracking area IDs TAI2 and TAI3 are included in the tracking area list for UE 12*c*. Thus, UE 12*c* may not initiate a TAU Request based merely upon transitioning from TAI2 to TAI3, but rather may initiate a TAU Request based on a paging request, a timer function, or other network trigger/mechanism depending on the idle or connected mode of UE 12*c*. In turn, eNodeB 34.3 may forward the TAU Request message along with the TAI for the tracking area from which the TAU Request message was received, here, tracking area ID TAI3 to MME 40. The TAU message may include tracking area ID for the last tracking area associated with UE 12*c*, here tracking area ID TAI2.

Based on a comparison between the previous tracking area ID TAI2 for UE 12*c*, the current tracking area ID TAI3 for UE 12*c* and the ULI IEs corresponding to tracking area IDs TAI1 and TAI2 for DPLA 61, DPLA module 44*a* in MME 40 may determine that UE 12*c* has exited the first DPLA 61. MME 40 may report the location change for UE 12*c* to PGW/PCEF 14/15 with regard to the location change, which can include the user ID associated with UE 12*c* and the ULI IE for tracking area ID TAI3. Based on a comparison between the previous tracking area ID TAI2 for UE 12*c*, the current tracking area ID TAI3 for UE 12*c* and the ULI IE corresponding to tracking area ID TAI2 for second DPLA 62, DPLA module 44*a* in MME 40 may determine that UE 12*c* has exited the second DPLA 62. However, since MME 40 has already sent a location change message to PGW/PCEF 14/15 with regard to tracking area ID TAI3, another location change message may not be necessary.

At any time during operation of communication system 10, AF 16 may initiate a dynamic policy event for one or more locations for which a policy change should apply. For purposes of the present example, it is assumed that AF 16 initiates first and second dynamic policy events when UE 12*a* and 12*b* are inside the first DPLA 61, UE 12*b* is inside the second DPLA 62 and UE 12*c* is outside both the first and second DPLA 61 and 62. AF 16 may initiate the first dynamic policy event by generating a first peer-based Rx AAR message and communicating the message to peer PCRF 36. The first peer-based Rx AAR message may include (among other things) a list of ULI IEs for one or more areas to be affected by the first policy change, including ULI IEs TAI1 and TAI2 that are members of the first DPLA 61, and a first AF-application ID1 for a first service definition representing a first user service for the first policy change.

Upon receiving the first peer-based Rx AAR message, PCRF 36 may determine one or more first dynamic policy action(s) to apply for the first DPLA 61 from the first AF-application ID1. In various embodiments, the first dynamic policy action(s) may include, but not be limited to, controlling the detection for service data flows, setting charging instructions for service data flows, setting QoS levels for service data flows and/or gating. PCRF 36 may generate a first per-Diameter-peer Gx RAR message and may communicate the message to peer PGW/PCEF 14/15. The first Gx RAR message may include (among other things) the list of ULI IEs, which can include the ULI IEs that are members of first DPLA 61, and a first dynamic policy action to apply to users in the one or more areas. PGW/PCEF 14/15 may compare the ULI IEs from the Gx RAR message to the ULI IEs received from MME 40 for the user location changes in order to identify one or more users/UE for application of the policy change. From the comparison, PGW/PCEF 14/15 can determine that UE 12*a* and 12*b* are in the corresponding areas (e.g., their ULI IEs match one of the ULI IEs from the list that are members of first DPLA 61) and may bind the first policy action to UE 12*a*-*b* by signaling to MME 40 to perform one or more per-user bearer operations such as, for example, modifying, activating or deactivating a default and/or dedicated bearer for each user session. If MME 40 is unable to perform the requested bearer operations, this may be reported by PGW/PCEF 14/15 to PCRF 36 via per-subscriber Diameter messages using standard Gx events.

For the second dynamic policy action, AF 16 may generate a second per-peer Rx AAR message including (among other things) a list of ULI IEs for one or more areas to be affected by the second policy change, including the ULI IE TAI2 that is a member of the second DPLA 62, and a second AF-application ID for a second service definition representing a second user service for the second policy change. AF 16 may communicate the second per-peer Rx AAR message to PCRF 36, which may determine a second policy action to apply to the second DPLA 62. PCRF 36 may generate a second per-Diameter-peer Gx RAR message including (among other things) the second policy action and the list of ULI IEs (including TAI2) and communicate the Gx RAR message to PGW/PCEF 14/15. PGW/PCEF 14/15 may compare the ULI IE (e.g., TAI2) for the second DPLA 62 to ULI IEs for the user location changes received from MME 40 in order to identify one or more users for application of the second policy change. From the comparison, PGW/PCEF 14/15 can determine that UE 12b are in the corresponding areas (e.g., their ULI IEs match the ULI IE for tracking area ID TAI2 from the list that is a member of second DPLA 62) and may bind the second policy action to UE 12b by signaling to MME 40 to perform one or more per-user bearer operations such as, for example, modifying, activating or deactivating a default and/or dedicated bearer for each user session. If MME 40 is unable to perform the requested bearer operations, this may be reported by PGW/PCEF 14/15 to the PCRF 36 via per-subscriber Diameter messages using standard Gx events. In some respects, overlapping DPLAs may act as mechanism to create different user classes for groups of users, wherein class identifiers for the groups may be determined from the overlapping areas of DPLAs.

Figure 5:
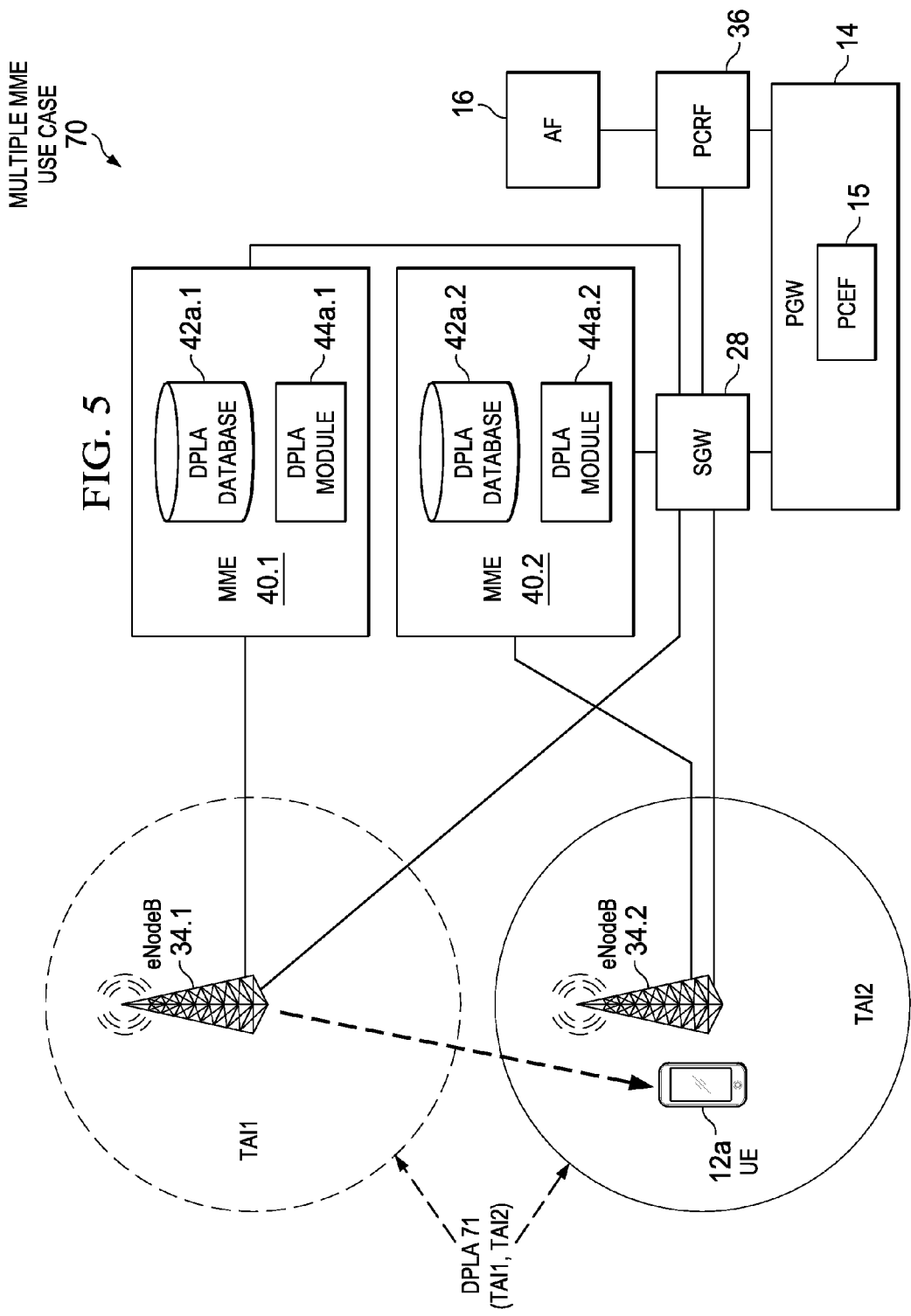

Turning to FIG. 5, FIG. 5 is simplified block diagram illustrating details associated with an example use case 70 for applying a dynamic policy change to a user for a DPLA 71 served by a pair of MMEs 40.1-40.2. Also illustrated in FIG. 5 are AF 16, PCRF 36, PGW/PCEF 14/15 and SGW 28 of communication system 10. FIG. 5 also illustrates a first DPLA database 42a.1 and first DPLA module 44a.1 included in a first MME 40.1 and a second DPLA database 42a.2 and second DPLA module 44a.2 in a second MME 40.2.

For this particular example, a first tracking area having a tracking area ID TAI1 is served by a first eNodeB 34.1 and the first MME 40.1. A second tracking area having a tracking area ID TAI2 is served by a second eNodeB 34.2 and the second MME 40.2. A user operating UE 12a is shown as transitioning among the tracking areas TAI1 and TAI2. For this example, DPLA 71 is illustrated as being defined by the first and second tracking area IDs TAI1 and TAI2. Only one user is described for FIG. 5 to highlight features of the communication system 10 in a multi-MME deployment for a user transition across location areas within a DPLA between multiple MMEs, however, it should be understood that similar operations may be performed for multiple users, as described in other examples provided throughout the present disclosure.

In a deployment including multiple MMEs, such as that shown in FIG. 5, each MME should receive the same DPLA configuration for all DPLAs serviced by the communication system 10 in order to maintain DPLA and subscriber session context between MMEs and PGW/PCEFs. Thus, in the present example, both the first and second MMEs 40.1, 40.2 should each receive the same configuration for DPLA 71. A pair of ULI IEs that correspond to the first and second tracking area IDs TAI1, TAI2, which may represent DPLA 71, may be stored in the first and second DPLA databases 42a.1 and 42a.2. The first and second MMEs 40.1 and 40.2 may receive location updates from UE 12a according the details provided herein.

As depicted by the dashed arrows in FIG. 5, UE 12a is transitioning from previous tracking area ID TAI1 to current tracking area ID TAI2. For purposes of the present example, tracking area ID TAI1 is included in a tracking area list for user 12a. As UE 12a transitions into TAI2, UE 12a may signal (among other things) a TAU request message to eNodeB 34.2, which may forward the TAU message to the second MME 40.2 along with the TAI for the tracking area from which the TAU message was received, here, tracking area ID TAI2. The TAU message may include tracking area ID for the last tracking area associated with user 12a, here tracking area ID TAI1. Based on a comparison between the previous tracking area ID TAI1 for UE 12a, the current tracking area ID TAI2 for UE 12a and the ULI IEs corresponding to tracking area IDs TAI1 and TAI2 for DPLA 71, DPLA module 44a.2 in MME 40.2 may determine that UE 12a has neither entered nor exited the DPLA 71 but merely transitioned between locations for DPLA 71. Second MME 40.2 may not report the location change for user 12a to PGW/PCEF 14/15.

Although second MME 40.2 may not provide location change reporting to PGW/PCEF 14/15 because UE 12a remained in DPLA 71 after the transition, the communication system 10 should still track messaging from UE 12a through the second MME 40.2. Such tracking may be implemented to determine which MME is serving UE 12a so that PGW/PCEF 14/15 may know the appropriate MME to communicate with in order to apply policy actions, flow controls, etc. to UE 12a. In various embodiments, standard TAU reporting procedures or DPLA-specific reporting mechanisms may be implemented to manage tracking area messaging when a user may transition MMEs but stays within a particular DPLA.

Based on the assumption that PGW/PCEF 14/15 determines that UE 12a is messaging through the second MME 40.2, policy action messaging between the AF 16, PCRF 36 and PGW/PCEF 14/15 may be handled in a similar manner as described for other example embodiments discussed herein.

Figure 6:
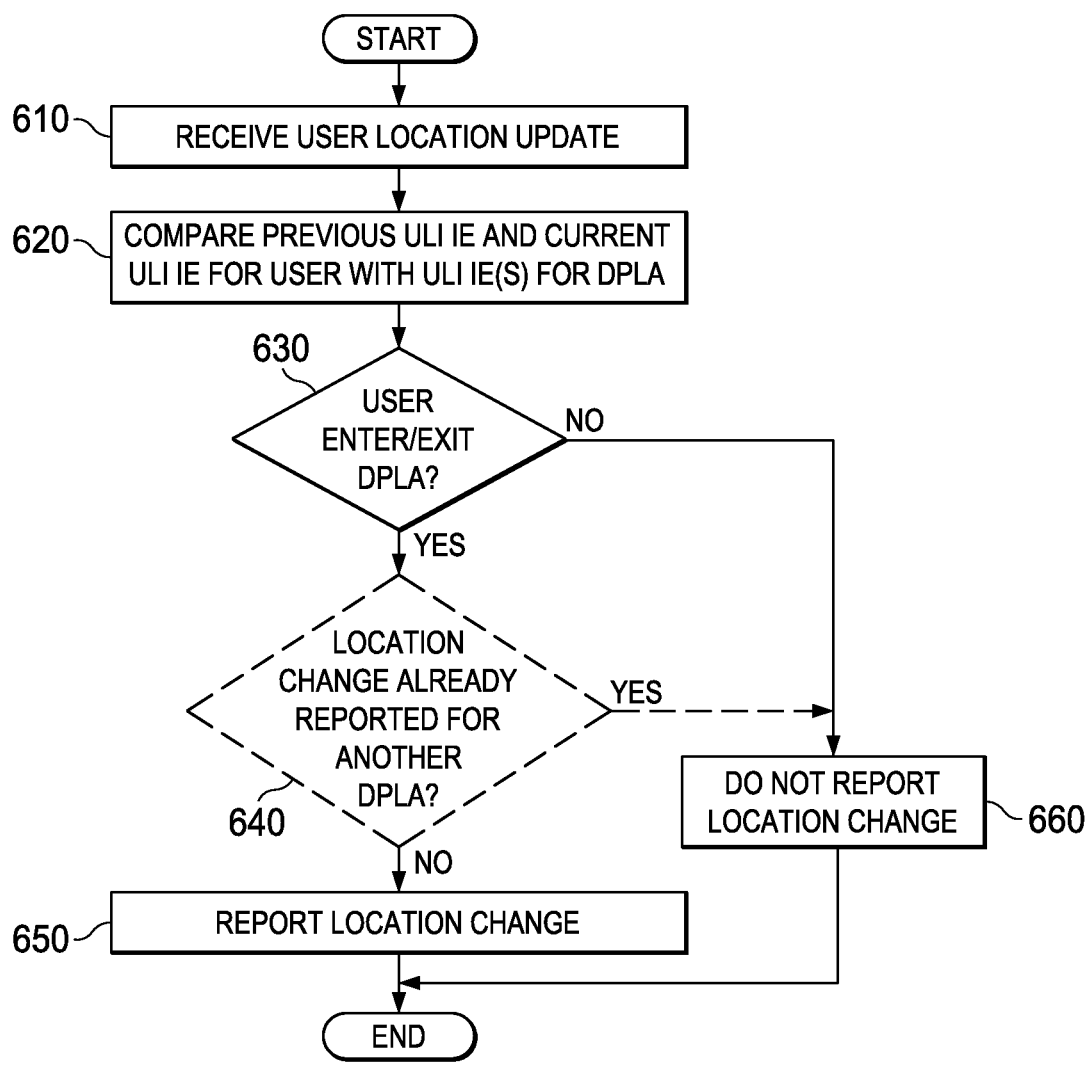
FIG. 6 is a simplified flow diagram illustrating example operations associated with reporting location changes in one embodiment of the communication system.

Turning to FIG. 6, FIG. 6 is a simplified flow diagram 600 illustrating example operations associated with reporting location change messages to PGW 14 in one example embodiment of the communication system 10. In one example embodiment, these operations may be carried out using DPLA database 42a and DPLA module 44a in MME 40 and/or DPLA database 42b and DPLA module 44b in S4-SGSN 41, however, for purposes of brevity, it is assumed that the example operations described for FIG. 6 are performed using DPLA database 42a and DPLA module 44a in MME 40. It should be understood that similar operations can be performed using DPLA database 42b and DPLA module 44b in S4-SGSN 41. As discussed herein, location change messages may be reported to PGW 14, thus PGW 14 may be involved in the example operations as well as far as receiving location change messages from MME 40.

For the present example embodiment, it is assumed that DPLA database 42a has been configured with one or more ULI IEs, which may represent a given DPLA. In general, DPLA module 44a can determine a user's location in relation to a given DPLA from a location update received from a given UE operated by the user. Thus, processing starts when a location update is received by MME 40 from a given UE at 610. The location update may include a current ULI IE and an ID for the user (e.g., IMSI).

At 620, DPLA module 44a may compare the current ULI IE and a previous ULI IE for the user to the one or more ULI IEs representing the DPLA. From the comparison, DPLA module 44a at 630 may determine whether the user has entered or exited the DPLA. If the user has entered or exited the DPLA, MME 40 may report the user's location change to PGW 14 at 650 via a location change message for the user. The location change message may include the user's ID and the corresponding current ULI IE. Otherwise the user's location change may not be reported as shown at 660.

In some embodiments, an individual location change message may be reported for each of one or more users. In other embodiments, a single location change message may include location reports for multiple users.

In an embodiment, DPLA module 44a may further determine if the location change for the user has already been reported for another DPLA at 640. If it has already been reported, DPLA module 44a may not report the user's location change with regard to entering or exiting the other DPLA at 660. Otherwise, DPLA module 44a may report the user's location change to PGW 14.

Figure 7:
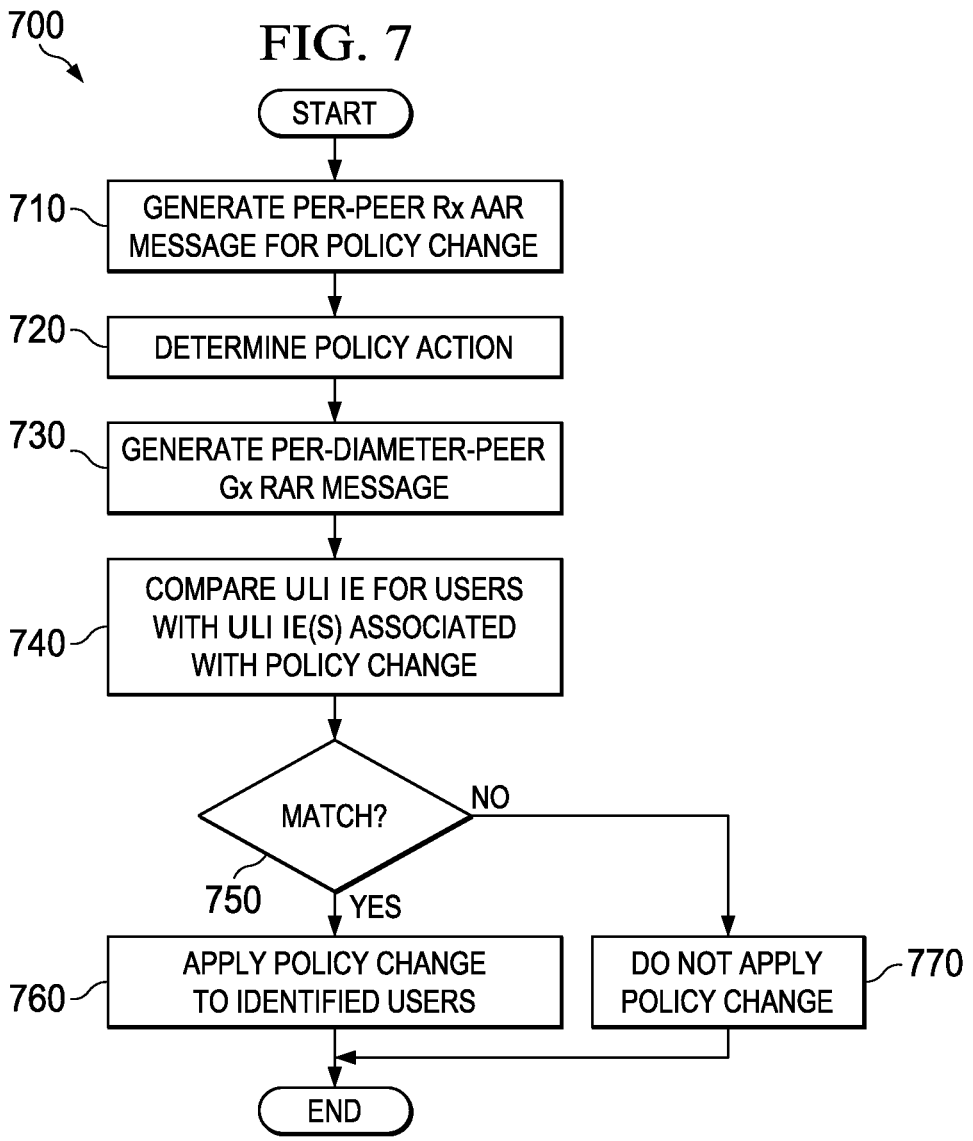
FIG. 7 is a simplified flow diagram illustrating example operations associated with applying a policy to a group of users in one embodiment of the communication system.

Turning to FIG. 7, FIG. 7 is a simplified flow diagram illustrating example operations associated with applying a policy change to a group of users in one embodiment of the communication system 10. In one example embodiment, these operations may be carried out using AF 16, PCRF 36 and PGW/PCEF 14/15. It should be understood that location change reporting operations as described throughout the examples discussed herein can be performed at any time for the communication system 10 as users enter and/or exit one or more DPLAs. Thus, reporting operations can occur during policy change operations.

In general, a policy change can be applied at any time to a group of users at one or more locations as determined by a service provider, network conditions, combinations thereof or the like. AF 16 may initiate a dynamic policy event for a given location for which a policy change should apply based on one or more conditions, as may be determined by a service provider and/or network element monitoring network conditions. Thus, processing starts at 710 when a per-peer Rx AAR message is generated by AF 16 for a policy change. The Rx AAR message may include a list of one or more ULI IEs, which can include one or more ULI IEs that may be members of one or more DPLAs, and an AF-application ID for a service definition, which may correspond to the policy change to be applied to one or more users in one or more locations corresponding to the one or more ULI IEs in the list.

At 720, PCRF 36 may receive the Rx AAR message and may determine a policy action for the policy change based on the AF-application ID. At 720, PCRF 36 may generate a per-Diameter-peer Gx RAR message including a policy action (determined from the AF-application ID) for the policy change and the list of one or more ULI IEs. PGW 14 may receive the Gx RAR message and may identify one or more users for application of the policy change at 740 by comparing a ULI IE for each user to the list of one or more ULI IEs from the Gx RAR message associated with the policy change. PGW 14 may identify the one or more users by determining whether a ULI IE for each user matches one of the ULI IEs from the list at 750. PGW/PCEF 14/15 may apply the policy change to the identified one or more users at 760. The policy change may be applied to the each of the users on a per-subscriber basis through one or more standard bearer operations via MME 40 and/or S4-SGSN 32 as discussed herein. In an embodiment, a failure to apply the policy action to a user identified in the group may be reported on a per-subscriber basis to PCRF 36 and/or AF 16, if AF 16 has requested such. No policy change may be applied to users not identified by the comparison at 770.

Other network nodes may be includes in communication system 10. In various embodiments, communication system 10 may be configured to include a proxy Diameter routing agent (P-DRA). A P-DRA may be deployed in a communication system to replace the point-to-point full mesh connectivity between PCC network elements and may provide load distribution for charging and control functions. A P-DRA typically routes traffic on a per-Diameter charging session basis for each user session. However, as discussed in the present disclosure Rx session messages may be communicated from the AF to the PCRF on a group-based per-peer PCRF basis and Gx messages may be communicated from the PCRF to the PGW/PCEF on a per-PCEF Diameter session basis. The fundamental operational aspects of communication system 10 including, for example, the reporting location changes from MMEs to PGWs as users/UE enter or exit a DPLA and, additionally, the incorporation of per-peer Rx AAR messages may be extended to a P-DRA deployment with some notable exceptions, as will be discussed in further detail below.

Figure 8:
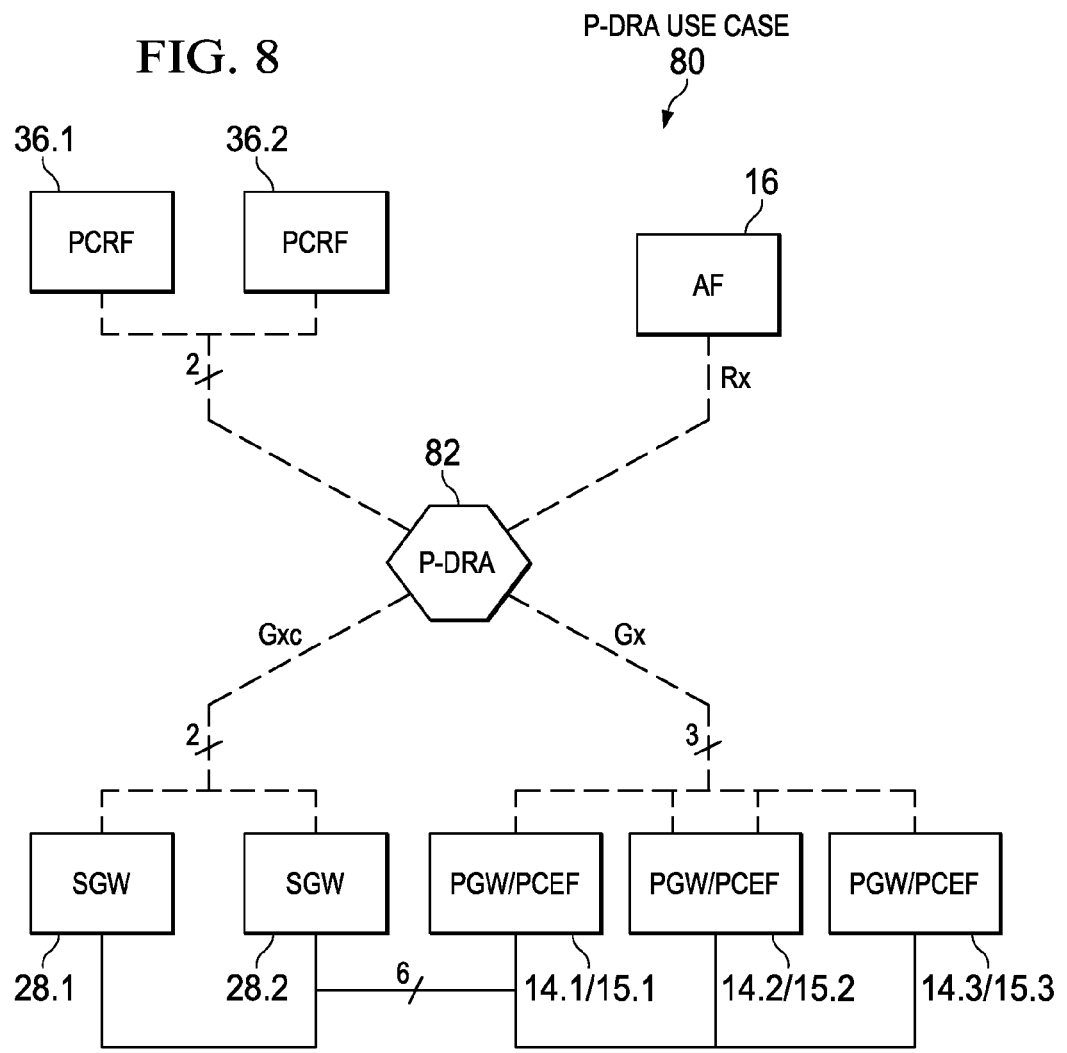
FIG. 8 is a simplified block diagram illustrating details associated with an example use case in a particular implementation of the communication system including a Proxy Diameter Routing Agent.

Turning to FIG. 8, FIG. 8 is a simplified block diagram illustrating details associated with an example use case 80 of the communication system 10 including a P-DRA 82. As illustrated in FIG. 8, communication system 10 may include AF 16, a pair of PCRFs 36.1-36.2, multiple PGW/PCEFs 14.1-14.3/15.1-15.3 and a pair of SGWs 28.1-28.2. Each of the network elements shown in FIG. 8 may connected to the P-DRA 82 through a corresponding Diameter-based interface. Regarding location change reporting from MMEs and/or S4-SGSNs for user transitions, this example embodiment may operate similar to the other example embodiments discussed in the present disclosure reporting location change messages to correspond PGW/PCEFs.

To perform Diameter routing in communication system 10, P-DRA 82 may store a mapping information for all Diameter peer nodes in communication system 10 and for sessions established over the various Gx/Rx session messaging interfaces. There may be several alternatives for configuring system 10 including P-DRA 82 to manage the routing information between the various network elements.

In one example embodiment, P-DRA 82 may be configured to recognize a common "user" binding or correlation key (e.g. a same value) for a special user session type (e.g., a DPLA session). P-DRA 82 may be configured with a function to route an Rx AAR message that includes the correlation key to each of the clustered PCRFs 36.1-36.2. Gx per-peer Diameter session messages between PCRFs 36.1-36.2 and PGW/PCEFs 14.1-14.3/15.1-15.3 and the Rx session messages between AF 16 and PCRFs 36.1-36.2 may include the correlation key. This optimization means that AF 16 may only send one Rx AAR for all PGWs instead of a separate Rx AAR for each of the PGWs. Of course, each PCRF would still need to send a separate Gx RAR message to each PCEF peer.

In another example embodiment, P-DRA 82 may be configured to recognize a correlation key included an Rx AAR message and may send the message to a particular PCRF. The PCRF can then distribute the message to other PCRFs, which may be servicing corresponding sessions. In another embodiment, P-DRA 82 may be configured to recognize a correlation key included in an Rx AAR message and may choose a particular PCRF for which to send the message. The PCRF may then distribute the message to other PCRFs, which may be servicing corresponding sessions. In yet another embodiment, Release 12 of 3GPP standards includes an option to configure a PCRF to register for ULI IE changes for a given user. In such an embodiment, a particular PCRF could parse ULI IEs in an Rx AAR message for one or more corresponding registered users to determine which PGW to send Gx messages to.

In an embodiment, the correlation key may be a pseudo IMSI selected by an operator or AF 16 or randomly generated by a network element. In another embodiment, the correlation key may be a framed IPV6 prefix.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a DPLA database or DPLA module are provided within the network elements, these elements can be provided externally, or consolidated and/or combined in any suitable fashion. In certain instances, a DPLA database and/or DPLA module may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for a communication network comprising:
reporting one or more location changes for a plurality of users from a first network element to a second network element based on transitions for each of the one or more users in relation to a policy location area, wherein the policy location area is defined by one or more first user location information (ULI) information elements (IEs) and wherein the reporting is performed using a single message for reporting the one or more location changes for the plurality of users;

communicating, for a group comprising the plurality of users, a single per-peer Rx authorization and accounting request (Rx AAR) message from a third network element to a fourth network element to initiate a policy change for the group, wherein the per-peer Rx AAR message comprises an application identifier (ID) for a service definition and the one or more first ULI IEs that define the policy location area;

communicating, for the group comprising the plurality of users, a single per-Diameter-peer Gx reauthorization request (Gx RAR) message from the fourth network element to the second network element, wherein the per-Diameter-peer Gx RAR message comprises a policy action for the policy change for the group based on the service definition and the one or more first ULI IEs that define the policy location area, wherein the communicating includes routing the per-peer Rx AAR message and the per-Diameter-peer Gx RAR message using a Proxy Diameter Routing Agent (P-DRA) and wherein the per-peer Rx AAR message and the per-Diameter-peer Gx RAR message each further comprise a correlation key;

identifying, at the second network element, one or more users belonging to the group for application of the policy change based, at least in part, on a corresponding ULI IE for each user for which a location change was reported and the one or more first ULI IEs that define the policy location area; and applying the policy change to each of the identified one or more users.

2. The method of claim 1, wherein the second network element is a packet data network gateway (PGW), the third network element is an Application Function (AF) and the fourth network element is a Policy and Charging Rules Function (PCRF).

3. The method of claim 1, wherein the transitions for each of one or more users include at least one of:
a particular user entering the policy location area; and
a particular user exiting the policy location area.

4. The method of claim 1, wherein the first network element is at least one of a Mobility Management Entity (MME); a S4 Serving Gateway Support Node (S4-SGSN); and a GnGp-SGSN.

5. The method of claim 1, wherein the reporting further comprises:
receiving at the first network element a location update for a particular user based on a transition for the user, wherein the location update includes a current ULI IE for the user and an ID for the user;
comparing a previous ULI IE and the current ULI IE for the particular user to the one or more first ULI IEs that define the policy location area to determine if the particular user has entered or exited the policy location area; and
reporting a location change for the particular user to the second network element based on the particular user entering or exiting the policy location area.

6. The method of claim 5, further comprising:
determining whether another location change has been reported for the particular user for another policy location area for the location update;
if another location change has been reported for the particular user, not reporting the location change for the particular user; and if another location change has not been reported for the particular user, reporting the location change for the particular user.

7. The method of claim 1, wherein the applying the policy change further comprises at least one of:
   modifying at least one bearer for at least one of the identified one or more users;
   activating at least one bearer for at least one of the identified one or more users; and
   deactivating at least one bearer for at least one of the identified one or more users.

8. The method of claim 1, wherein the identifying the one or more users belonging to the group for application of the policy change further comprises:
   for each user for which a location change was reported, comparing the ULI IE for each user to each of the one or more first ULI IEs that define the policy location area; and
   identifying a user for the policy change based on the ULI IE for the user matching one of the one or more first ULI IEs that define the policy location area.

9. The method of claim 1, wherein the plurality of users belonging to the group are identified based additionally on a class identifier for each of the one or more users belonging to the group.

10. The method of claim 1, wherein the one or more first ULI IEs that define the policy location area represent at least one of: a cell identity (ID); a set cell of IDs representing contiguous cells; a set of cell IDs representing non-contiguous cells; a plurality of sets of cell IDs representing sets of contiguous cells; a tracking area; and a routing area.

11. One or more non-transitory tangible media encoding logic that includes instructions for execution that when executed by a processor, is operable to perform operations comprising:
   reporting one or more location changes for a plurality of users from a first network element to a second network element based on transitions for each of the one or more users in relation to a policy location area, wherein the policy location area is defined by one or more first user location information (ULI) information elements (IEs) and wherein the reporting is performed using a single message for reporting the one or more location changes for the plurality of users;
   communicating, for a group comprising the plurality of users, a per-peer single Rx authorization and accounting request (Rx AAR) message from a third network element to a fourth network element to initiate a policy change for the group, wherein the per-peer Rx AAR message comprises an application identifier (ID) for a service definition and the one or more first ULI IEs that define the policy location area;
   communicating, for the group comprising the plurality of users, a single per-Diameter-peer Gx reauthorization request (Gx RAR) message from the fourth network element to the second network element, wherein the per-Diameter-peer Gx RAR message comprises a policy action for the policy change for the group based on the service definition and the one or more first ULI IEs that define the policy location area, wherein the communicating includes routing the per-peer Rx AAR message and the per-Diameter-peer Gx RAR message using a Proxy Diameter Routing Agent (P-DRA) and wherein the per-peer Rx AAR message and the per-Diameter-peer Gx RAR message each further comprise a correlation key;
   identifying, at the second network element, one or more users belonging to the group for application of the policy change based, at least in part, on a corresponding ULI IE for each user for which a location change was reported and the one or more first ULI IEs that define the policy location area; and
   applying the policy change to each of the identified one or more users.

12. The media of claim 11, wherein the reporting further comprises:
   receiving at the first network element a location update for a particular user based on a transition for the particular user, wherein the location update includes a current ULI IE for the user and an ID for the particular user;
   comparing a previous ULI IE and the current ULI IE for the particular user to the one or more first ULI IEs that define the policy location area to determine if the particular user has entered or exited the policy location area; and
   reporting a location change for the particular user to the second network element based on the particular user entering or exiting the policy location area.

13. The media of claim 12, further comprising:
   determining whether another location change has been reported for the particular user for another policy location area for the location update;
   if another location change has been reported for the particular user, not reporting the location change for the particular user; and
   if another location change has not been reported for the particular user, reporting the location change for the particular user.

14. The media of claim 11, wherein the identifying the one or more users belonging to the group for application of the policy change further comprises:
   for each user for which a location change was reported, comparing the ULI IE for each user to each of the one or more first ULI IEs that define the policy location area; and
   identifying a user for the policy change based on the ULI IE for the user matching one of the one or more first ULI IEs that define the policy location area.

15. An apparatus, comprising:
   a dynamic policy location area (DPLA) module;
   a memory element for storing data; and
   a processor that executes instructions associated with the data, wherein the processor and the memory element cooperate such that the apparatus is configured for:
      reporting one or more location changes for a plurality of users from a first network element to a second network element based on transitions for each of the one or more users in relation to a policy location area, wherein the policy location area is defined by one or more first user location information (ULI) information elements (IEs) and wherein the reporting is performed using a single message for reporting the one or more location changes for the plurality of users;
      communicating, for a group comprising the plurality of users, a single per-peer Rx authorization and accounting request (Rx AAR) message from a third network element to a fourth network element to initiate a policy change for the group, wherein the per-peer Rx AAR message comprises an application identifier (ID) for a service definition and the one or more first ULI IEs that define the policy location area;
      communicating, for the group comprising the plurality of users, a single per-Diameter-peer Gx reauthorization request (Gx RAR) message from the fourth network element to the second network element, wherein the per-Diameter-peer Gx RAR message comprises a policy action for the policy change for the group based on the service definition and the one or more first ULI IEs that define the policy location area, wherein the communicating includes routing the per-peer Rx AAR message and the per-Diameter-peer Gx RAR message using a Proxy Diameter Routing Agent (P-DRA) and wherein the per-peer Rx AAR message and the per-Diameter-peer Gx RAR message each further comprise a correlation key;

identifying, at the second network element, one or more users belonging to the group for application of the policy change based, at least in part, on a corresponding ULI IE for each user for which a location change was reported and the one or more first ULI IEs that define the policy location area; and applying the policy change to each of the identified one or more users.

16. The apparatus of claim 15, wherein the reporting further comprises:

receiving at the first network element a location update for a particular user based on a transition for the particular user, wherein the location update includes a current ULI IE for the user and an ID for the particular user;

comparing a previous ULI IE and the current ULI IE for the particular user to the one or more first ULI IEs that define the policy location area to determine if the particular user has entered or exited the policy location area; and reporting a location change for the particular user to the second network element based on the particular user entering or exiting the policy location area.

17. The apparatus of claim 15, wherein the first network element is at least one of a Mobility Management Entity (MME); a S4 Serving Gateway Support Node (S4-SGSN); and a GnGp-SGSN; and wherein the second network element is a Packet Data Network Gateway (PGW), the third network element is an Application Function (AF) and the fourth network element is a Policy and Charging Rules Function (PCRF).

18. The apparatus of claim 15, wherein the transitions for each of one or more users include at least one of:

a particular user entering the policy location area; and a particular user exiting the policy location area.

* * * * *